FIG. I

INVENTOR.
VERNON F. PARRY

INVENTOR.
VERNON F. PARRY

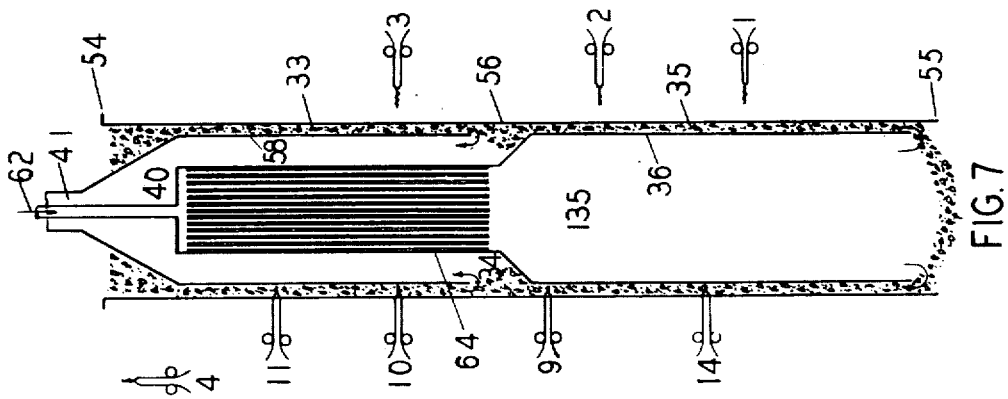
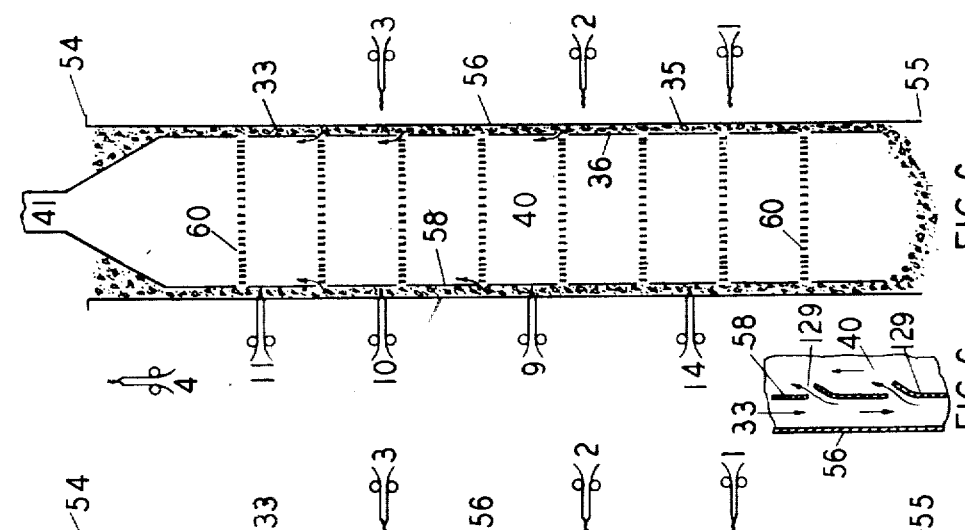
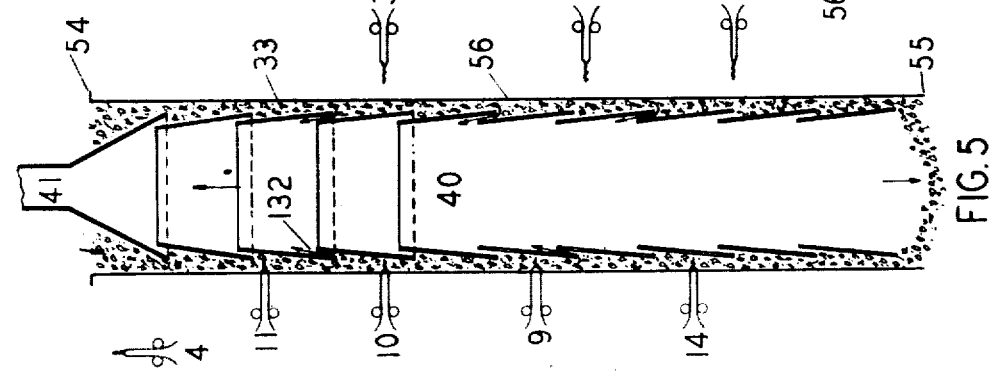

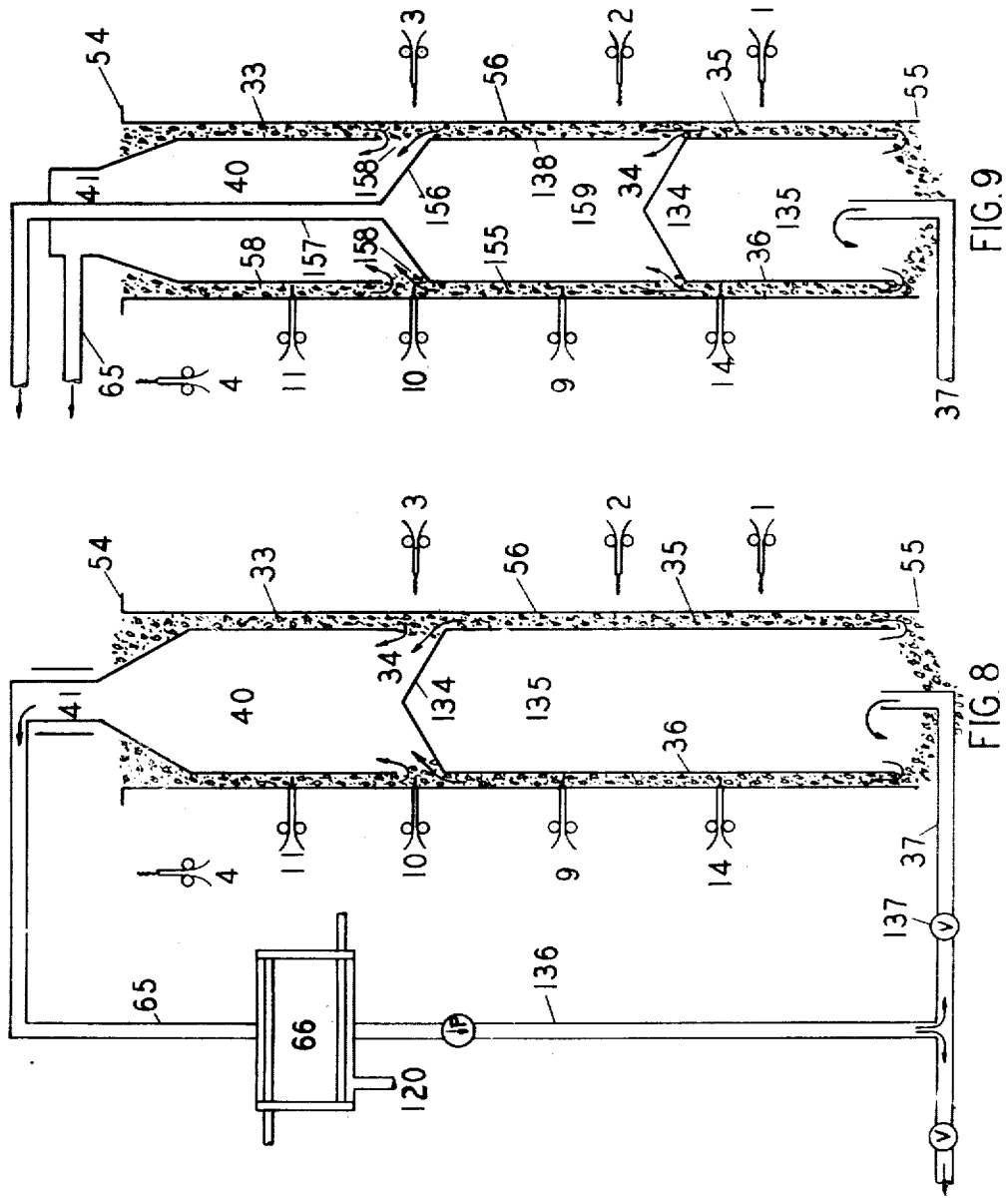

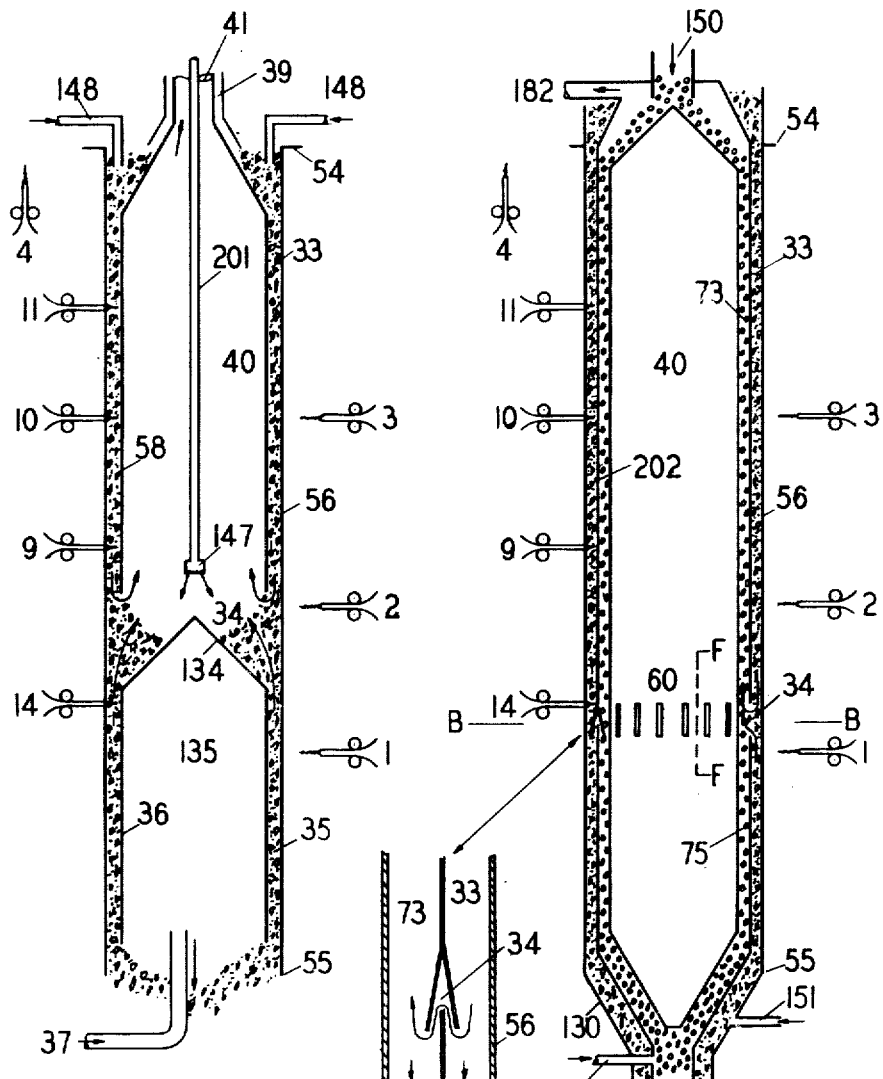

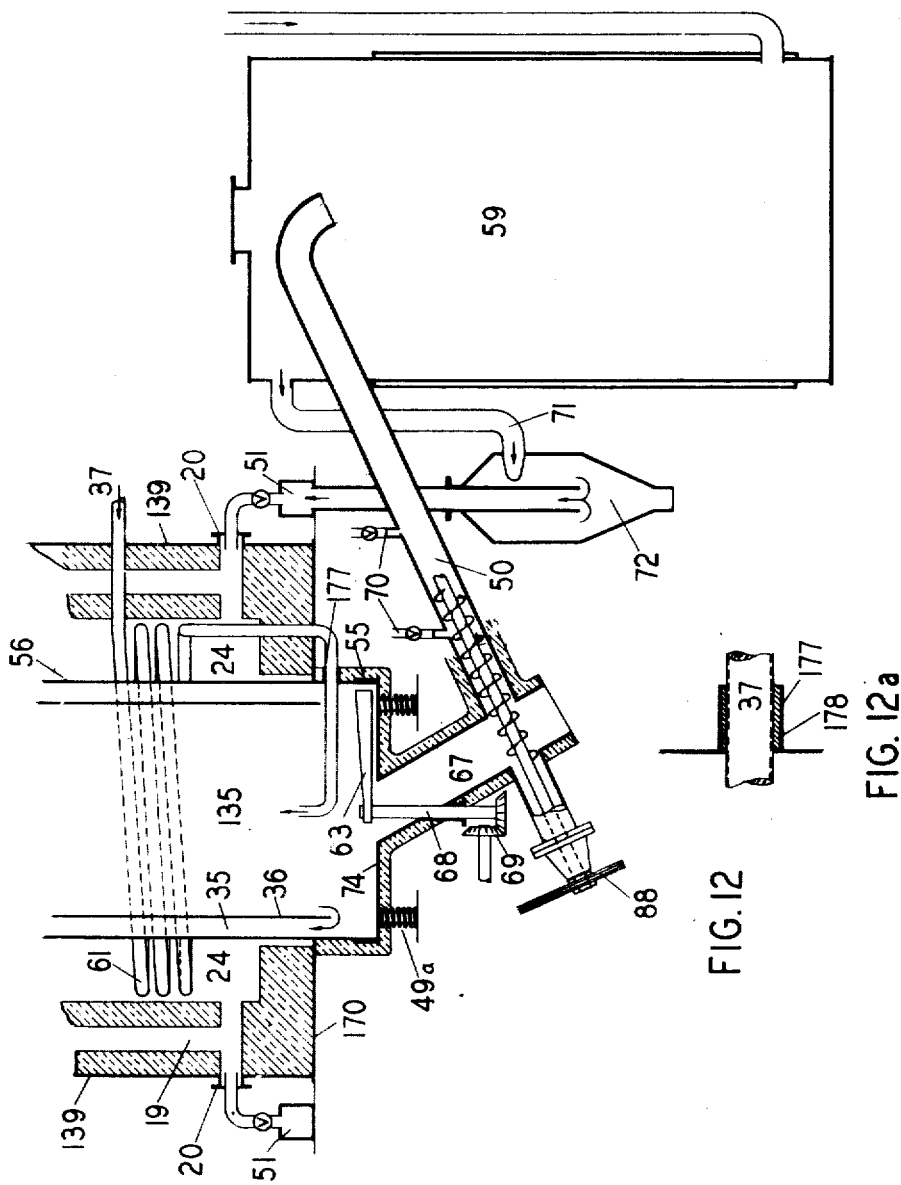

Oct. 23 1951  V. F. PARRY  2,572,051
METHOD FOR CONDUCTING AN ENDOTHERMIC CHEMICAL REACTION
INVOLVING BOTH GASEOUS AND SOLID FEED MATERIALS
Filed April 20, 1945  12 Sheets-Sheet 9
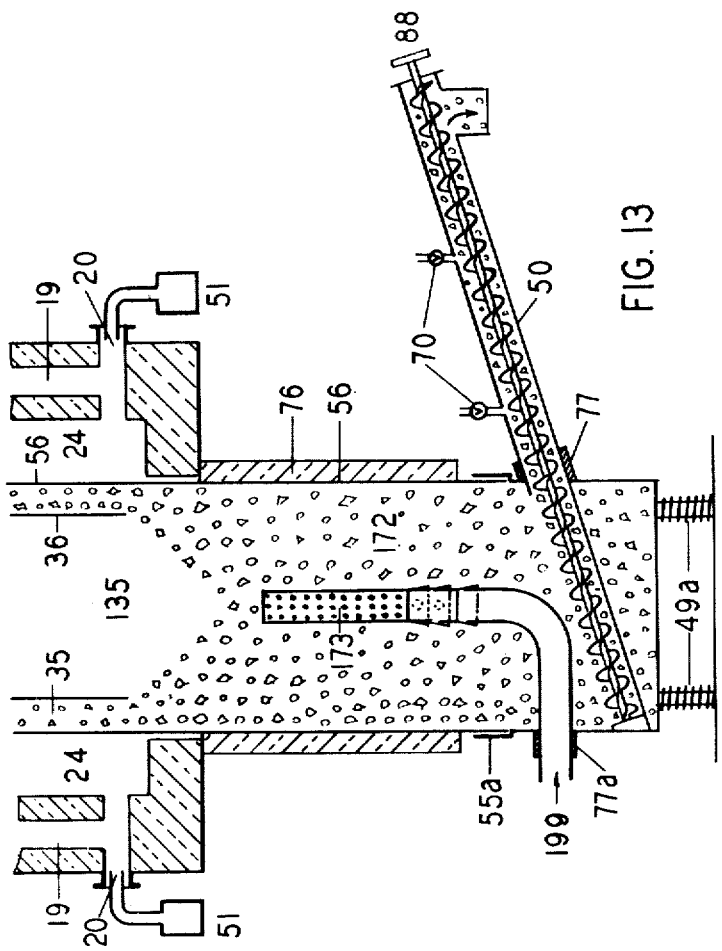
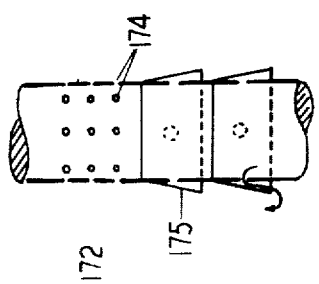
INVENTOR.
VERNON F. PARRY
BY

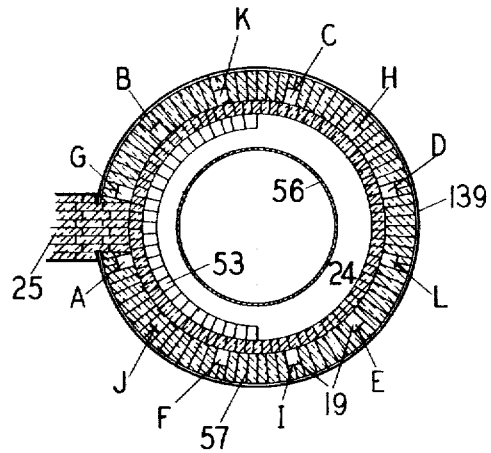
FIG. 14a
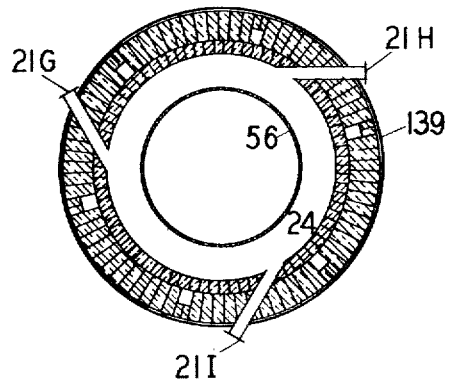
FIG. 14b
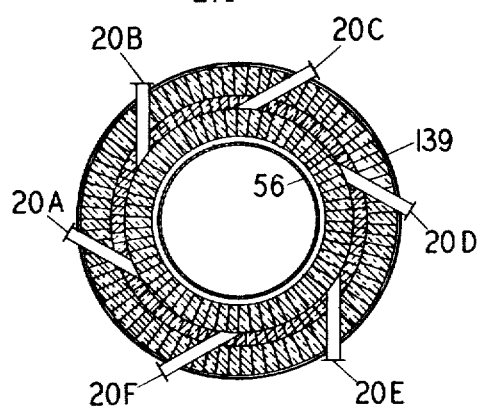
FIG. 14c
FIG. 14

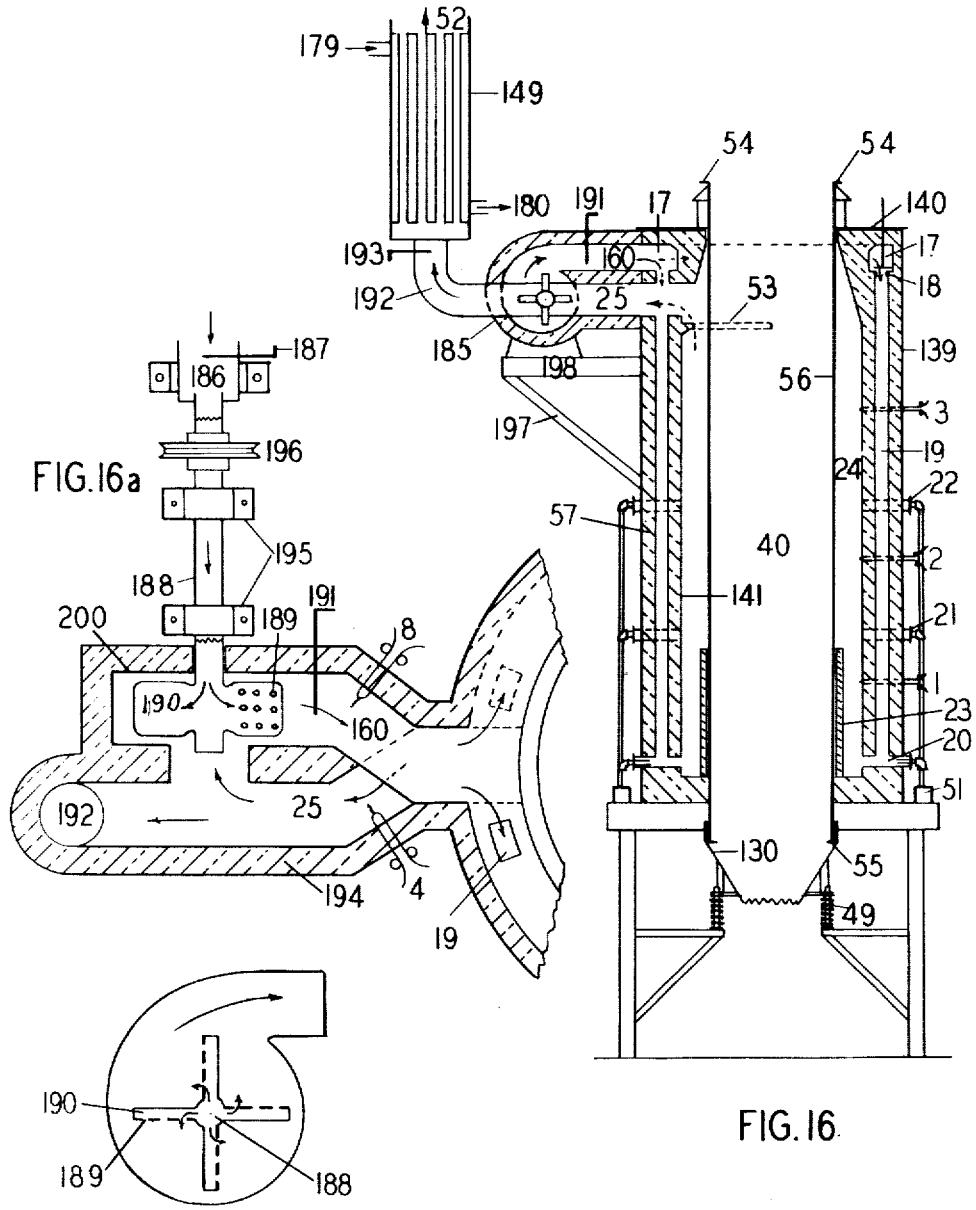

Patented Oct. 23, 1951

2,572,051

UNITED STATES PATENT OFFICE 2,572,051

METHOD FOR CONDUCTING AN ENDOTHERMIC CHEMICAL REACTION INVOLVING BOTH GASEOUS AND SOLID FEED MATERIALS

Vernon Frank Parry, Golden, Colo.

Application April 20, 1945, Serial No. 589,450

2 Claims. (Cl. 48—203)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to chemical reaction apparatus and methods, and more particularly to suitable methods and devices for carrying out endothermic chemical reactions involving solid and gaseous or vaporous materials. Still more particularly, this invention relates to processes for the production of synthesis gas and fuel gas from subbituminous coal or other non-caking or non-agglomerating carbonaceous materials in a vertically ranging externally heated annular retort.

Heretofore in the fuel converting art large reaction vessels requiring heat transfer at high temperatures, have been made of refractory fire brick and heated by gas or oil-fired ovens. Such refractory fire-brick settings have low thermal conductivity and they transmit heat relatively slowly compared with the heat transfer which may be transmitted through metals. In the heating of metallic reaction vessels, troubles are usually encountered from local overheating which causes excessive corrosion, unequal expansion, and short useful life of the metal. It has now been found that by employing the special heating system herein described, alloy reaction vessels can be heated safely and uniformly in controlled atmosphere, and their useful life extended through a long period of continuous operation.

Heretofore, in the production of water gas, synthesis gas, and the like, it has been necessary to employ batch operation, alternately to blow steam through the incandescent fuel bed to yield such gas. It is not feasible to use low rank fuels such as lignite or subbituminous coal in machines employing intermittent alternating blasts of air and steam, because of decrepitation of the fuel under such treatment which causes excessive back pressure and abnormal losses in the form of fine dust. Therefore the low-rank fuels have not been used for making water gas, but it has now been found that in accordance with this invention, lignite, subbituminous coal, or other non-coking fuels can be gasified successfully, and the desired water gas reactions, as well as other chemical endothermic reactions involving solids and gaseous materials, can be carried out in a continuous manner at higher efficiencies than can be obtained by other processes.

In the United States the principal raw materials now used for manufacture of water gas are the higher rank bituminous coals used either in their natural state or converted to hard coke by well known carbonization processes. These fuels are not reactive and high temperatures are necessary when gasifying them by reaction with steam or other gases. It is not feasible to conduct the so called water gas reactions on high rank fuels in metal vessels because of rapid deterioration of the vessels caused by the high temperature of the reaction. On the other hand the low-rank fuels, such as subbituminous coal and lignite, have relatively high reactivity, endowed by nature, which permits the various water gas reactions to be conducted at relatively low temperatures within a range permitting use of alloy steel reaction vessels. For example the high rank fuels must be heated to temperatures in excess of 1800 degrees F. in order to make water gas by reaction with steam, but the low rank fuels start to react with water at temperatures as low as 1200 degrees F., and in the temperature range 1550 to 1850 degrees F. the rate of reaction is very fast, in fact fast enough to justify commercial operation. Thus it is feasible to make industrial water gas from low-rank fuels in externally heated metallic retorts because of the natural property of high reactivity possessed by these fuels, and this invention is designed to take advantage of that property.

This invention accordingly has for its object the provision of a method and apparatus for continuously carrying out endothermic chemical reactions involving a solid material having gas forming and liquefiable constituents and a gaseous substance. Another object is to provide a suitable method and apparatus for the continuous production of synthesis gas from lignite or other non-caking carbonaceous material. Another object is the continuous production of a gas containing a controlled ratio of hydrogen to carbon monoxide from non-caking carbonaceous materials, while producing a maximum quantity of condensible oil or tar from the carbonaceous materials with gasification of the carbon residue. Further objects relate to the production of relatively smokeless fuels from non-caking coals; to the reduction of metallic ores such as those of iron, magnesium, zinc, and similar ores; and to suitable apparatus for carrying out the foregoing reactions and reductions. An important object of the invention is the provision of a suitable combustion system, which employs improved means of recuperation, for heating the vertically ranging externally heated retort, and an improved air-cooled fan for recirculation of products of combustion. This heating system makes it possible to conduct the several processes described herein at maximum thermal efficiency. Other objects of the invention will be apparent or will appear as the ensuing description proceeds.

In accordance with this invention an endothermic chemical reaction process involving a solid material and a gaseous or vaporous substance is carried out by passing said material through a stage heated annular reaction zone while withdrawing gaseous reaction products from a heat exchange zone enveloped by said reaction zone. It has been found that stage heated annular reaction zones provide superior means for carrying out endothermic chemical reactions between solids and gases of vapors, since heat can be supplied to the reactants with very high efficiency in heat resisting metallic vessels, and by utilizing the interior of an annular reaction zone as a heat exchange zone for withdrawing gaseous or vaporous products, increased efficiency can be obtained.

This invention also contemplates carrying out an endothermic chemical reaction involving gaseous and solid materials by passing said materials concurrently downward through an externally-heated vertically ranging elongated annular reaction zone, withdrawing gaseous products from said reaction zone near the zone of maximum reaction temperature and discharging said gaseous products upwardly while maintaining them in indirect heat exchange relation to said descending reactants, then discharging spent solids from a lower annular reaction zone counter-currently to ascending gases, while maintaining said lower annular reaction zone in indirect heat exchange relation with incoming gaseous or vaporous reactants. By providing two annular reaction zones as described, the entering solid and gaseous materials are preheated while recovering heat from exhausted gaseous products, and after attaining a maximum reaction temperature, the solid reactants are further passed in heat exchange relation to additional incoming gaseous or vaporous reactants or carrier gases as the case may be.

This invention also comprises suitable apparatus for carrying out endothermic chemical reactions comprising an elongated vertically ranging vessel having means for heating the same and a heat exchange device within said vessel defining therewith an annular reaction zone, said device having an opening therein communicating with said annular reaction zone for withdrawing gaseous products of reaction from said zone.

In the following description, it should be understood that the term "gaseous" includes materials which are vapors at the temperatures encountered, such as for example, steam, oil vapors, and similar materials. Furthermore the terms non-caking, non-agglomerating, or non-coking are associated with and define a material that does not swell or fuse to destroy its ability to move by gravity as a relatively free-flowing material. In describing the apparatus and method of this invention, the description will be directed principally to the gasification of lignite or subbituminous coal, but the invention is not limited thereto as will be apparent.

The reader will appreciate the improvement in the art and efficiency of gasification of fuel made possible by this invention when he considers the brief comparison cited herewith:

In present commercial processes for the manufacture of synthesis gas from coke, as practiced by large War II industries, one ton of high-rank bituminous coking coal of 13,500 B. t. u. per pound, after coking in a coke oven, will make about 35,000 cubic feet of synthesis gas. The conversion requires 2 steps: a, Coking in the coke oven by intermittent operation; and b, gasification in a water gas machine by intermittent blasting with air and steam. In the continuous process comprising this invention one ton of natural subbituminous coal containing about 22 per cent water and having a heating value of only 9,300 B. t. u. per pound, is gasified continuously to produce 45,000 cubic feet of net synthesis gas in a single stage process that operates automatically.

In order to accomplish the high conversion efficiency, ranging from 60 to 75 per cent or higher, the heat saving devices and the counter-current heat exchange principles outlined herein have been invented.

Figure 1:
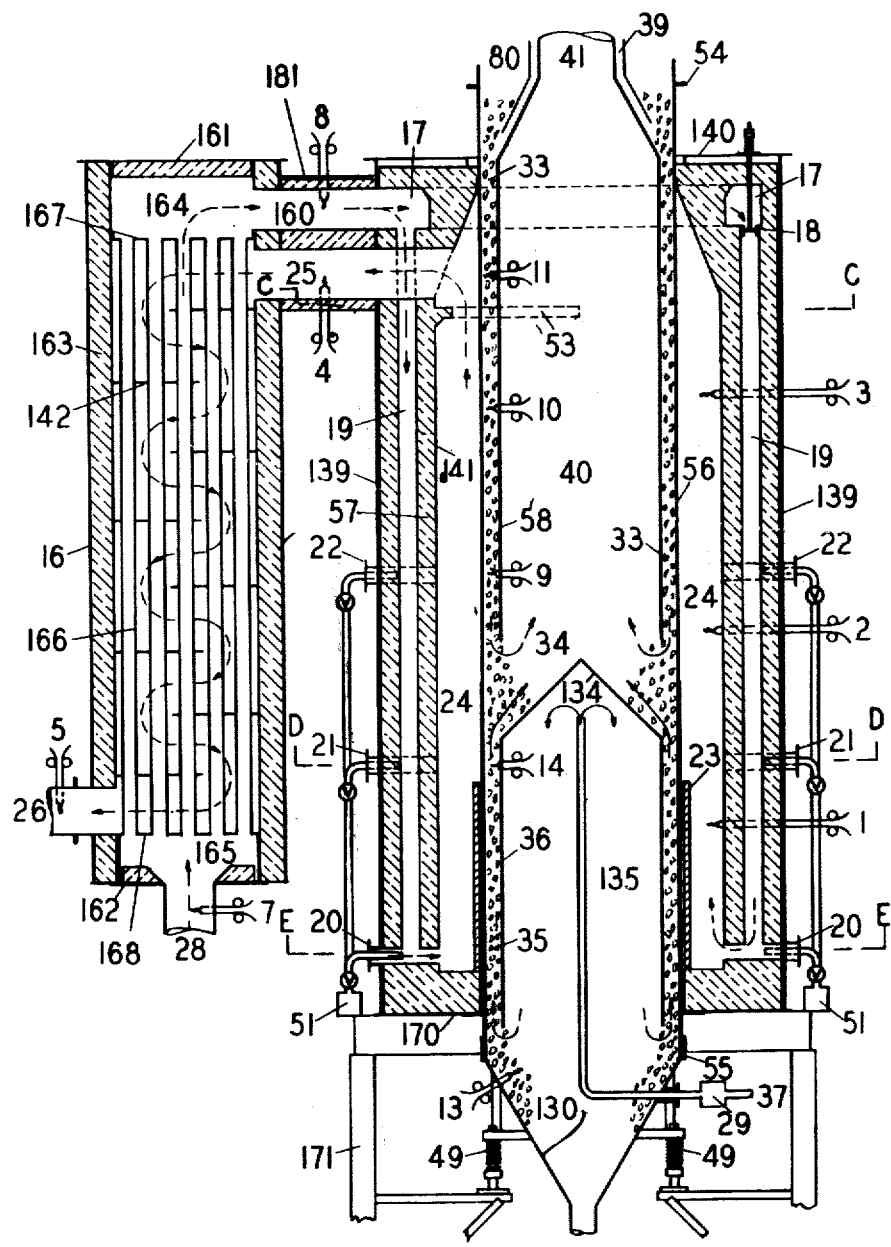
Figure 1 is a view partly in section and partly diagrammatic, showing a vertically ranging annular reaction apparatus having an external heating chamber and a recuperator associated therewith.
Figure 2:
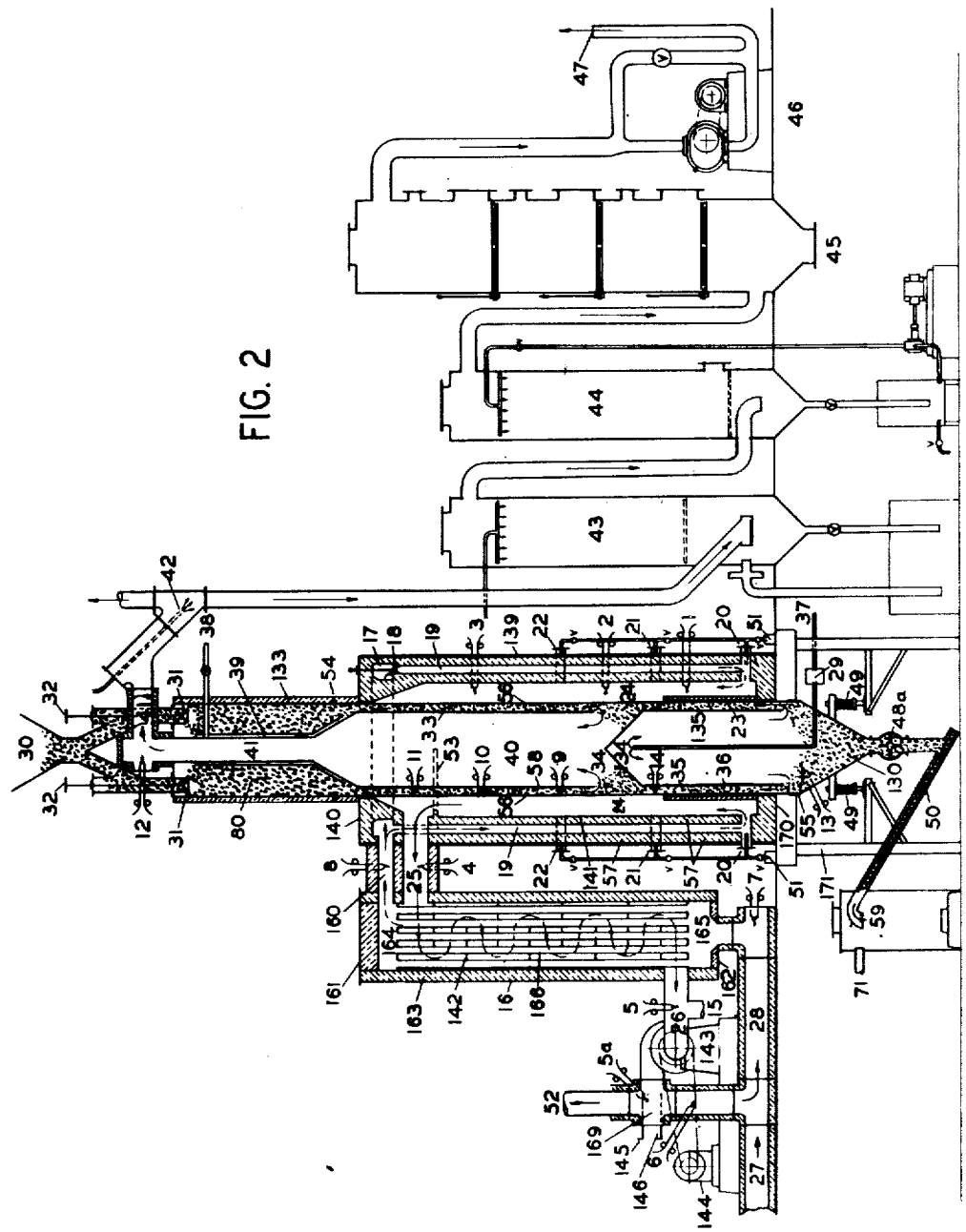
Figure 2 is a view, partly in section and partly diagrammatic, showing a vertically ranging annular reaction apparatus similar to Figure 1 and showing also a suitable arrangement for feeding incoming solids; removing, cooling, and scrubbing evolved gases and vapors; and recycling products of combustion.
Figures 4, 4A:
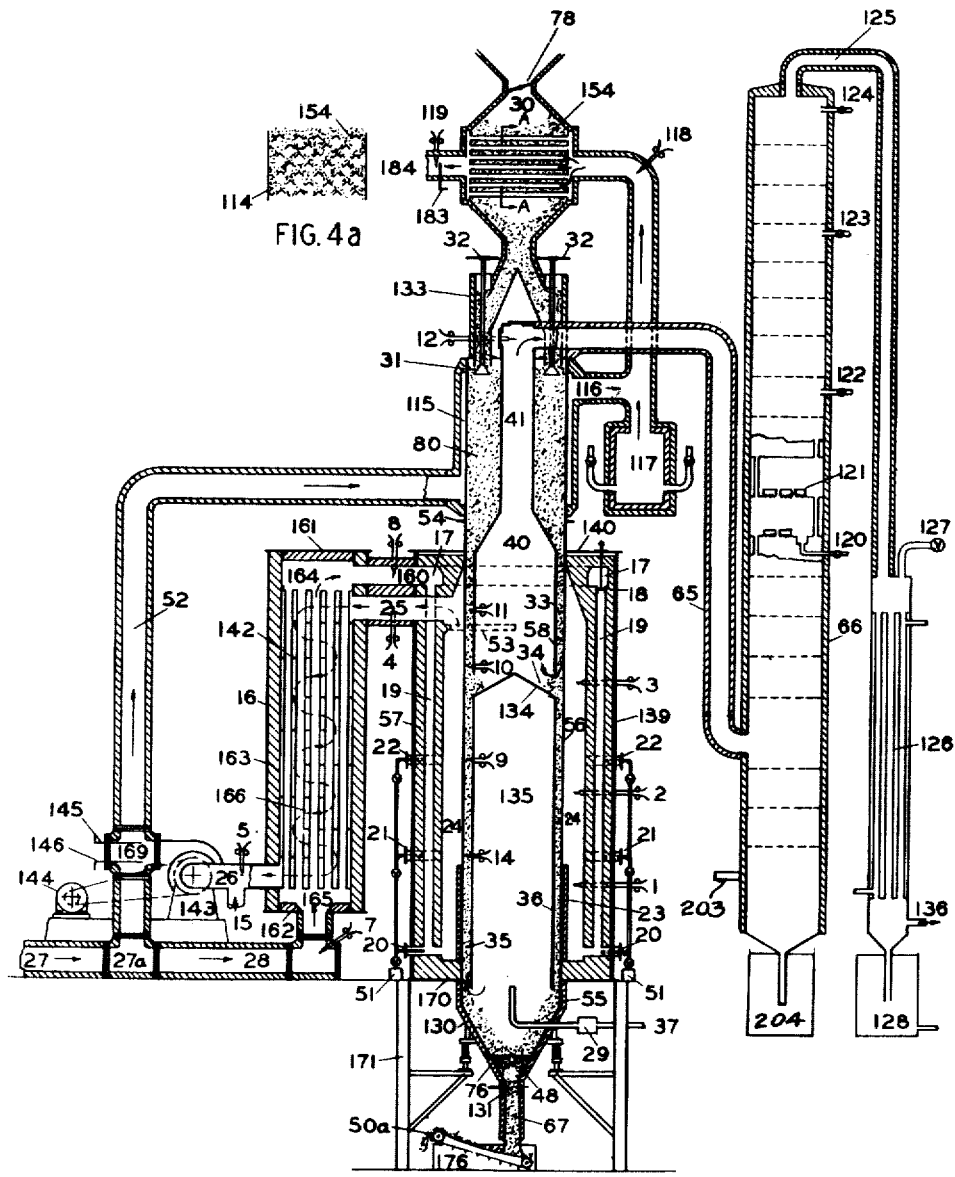

Figure 4 is a view, partly in section and partly diagrammatic of the device of Figures 1 and 2 suitably modified by the addition of heat exchange means for imparting heat to incoming solids from the spent products of combustion, and also providing a different arrangement of annular domes in the reaction zone particularly adapted to the production of oil and fixed gases from oil-bearing shales, or low-temperature tar and fixed gases from non-coking coals wherein secondary decomposition of distillation products is repressed. The figure also shows an arrangement of a bubble tower for fractional condensation of vapors.

Figure 5 is an enlarged sectional view, partly diagrammatic, wherein the central reaction annulus of Figures 1, 2, 3 and 4 is formed from a plurality of segmental overlapping annuli to accommodate removal of vapors.

Figure 6 is an enlarged view, partly diagrammatic, of an alternative arrangement for the central annulus of the apparatus shown in Figures 1, 2, 3 and 4, wherein the annulus has a series of slotted orifices for venting evolved gases assisted by the venturi effect.

Figure 6a is a detailed section of optional orifices in the inner cylindrical annulus of Figure 6.

Figure 7 is an enlarged sectional view of a further alternative arrangement for the annular reaction apparatus of Figures 1, 2, 3 and 4 provided with a supplementary heat exchanger in the central portion of the upper heat exchange zone whereby gases admitted to the lower heat exchange zone take up heat from the gaseous products of reaction.

Figure 8 is an enlarged view, partly in section and partly diagrammatic, of the annular portion of the apparatus of Figure 4 providing means for recirculating a portion of the fixed gases to the lower annulus.

Figure 9 is an enlarged detailed sectional view, partly diagrammatic, showing a modification of the superposed annular reaction apparatus of Figure 7 adapted to the successive distillation of volatiles and gasification of residual carbon in non-agglomerating carbonaceous materials, such as lignite, subbituminous coal, and oil shales.

Figure 3:
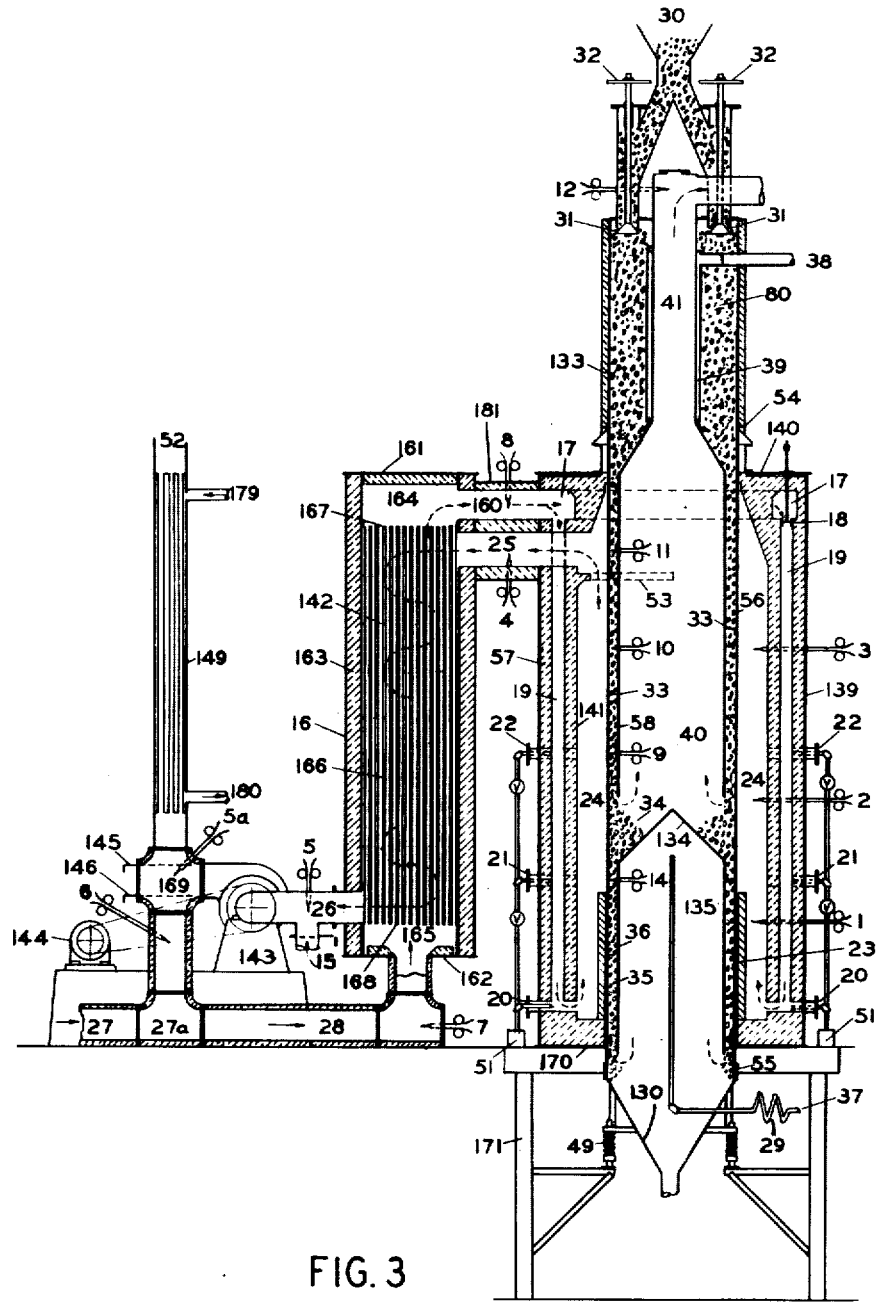
Figure 3 is a view, partly in section and partly diagrammatic, showing a generating unit and the recycling apparatus of Figure 2 on a somewhat enlarged scale.

Figure 10 is an enlarged sectional view, partly diagrammatic, showing the annular reaction device of Figure 3 having a suitable arrangement for introducing gas-oil or carburetting oil to both annular zones whereby carburetted water gas can be made continuously.

Figure 11 is a sectional view, partly diagrammatic, showing the addition of a second inner elongated annulus to the apparatus of Figures 1 and 3 whereby the apparatus becomes well suited for the reduction of granular iron ore.

Figure 11a is an enlarged view taken on the line B—B of Figure 11, showing the construction of optional vents for transferring gas from the inner to the outer annular zone.

Figure 12 is a sectional view, partly diagrammatic, of the lower part of the annular reaction vessel and furnace of Figures 2 and 3 showing a suitable mechanical scraper for removing spent material from the lower annulus, and a transfer screw to move the material into a gas producer. Means for directing hot gas through a dust catcher and to the burner manifold are indicated. Figure 12 also shows a preheater inside the combustion chamber for preheating steam or fixed gases introduced into the lower annulus.

Figure 12a is a detailed section of the inlet pipe to the lower reaction zone showing a packing gland and collar.

Figure 13 is a sectional view, partly diagrammatic, of the lower part of the annular reaction vessel and furnace of Figure 4 having a central draft inlet for introduction of air and steam to gasify fixed carbon and volatile matter in spent shale or carbonaceous material discharged from the heated reaction annulus, a transfer screw to remove spent material and means for cooling the outgoing solids.

Figure 13a is an enlarged view of the central draft inlet showing an arrangement of ports and conical baffles providing for introduction of a gaseous reactant.

Figure 14 shows sectional views of the brickwork, gas firing ports, air ducts, and combustion chamber surrounding the annular vessel of Figures 1, 2 and 3. In Figure 14a the section is drawn horizontally across the vessel at points C—C referred to in Figure 1. Figure 14b shows a section through DD and Figure 14c is a section through EE of Figure 1.

Figure 15:
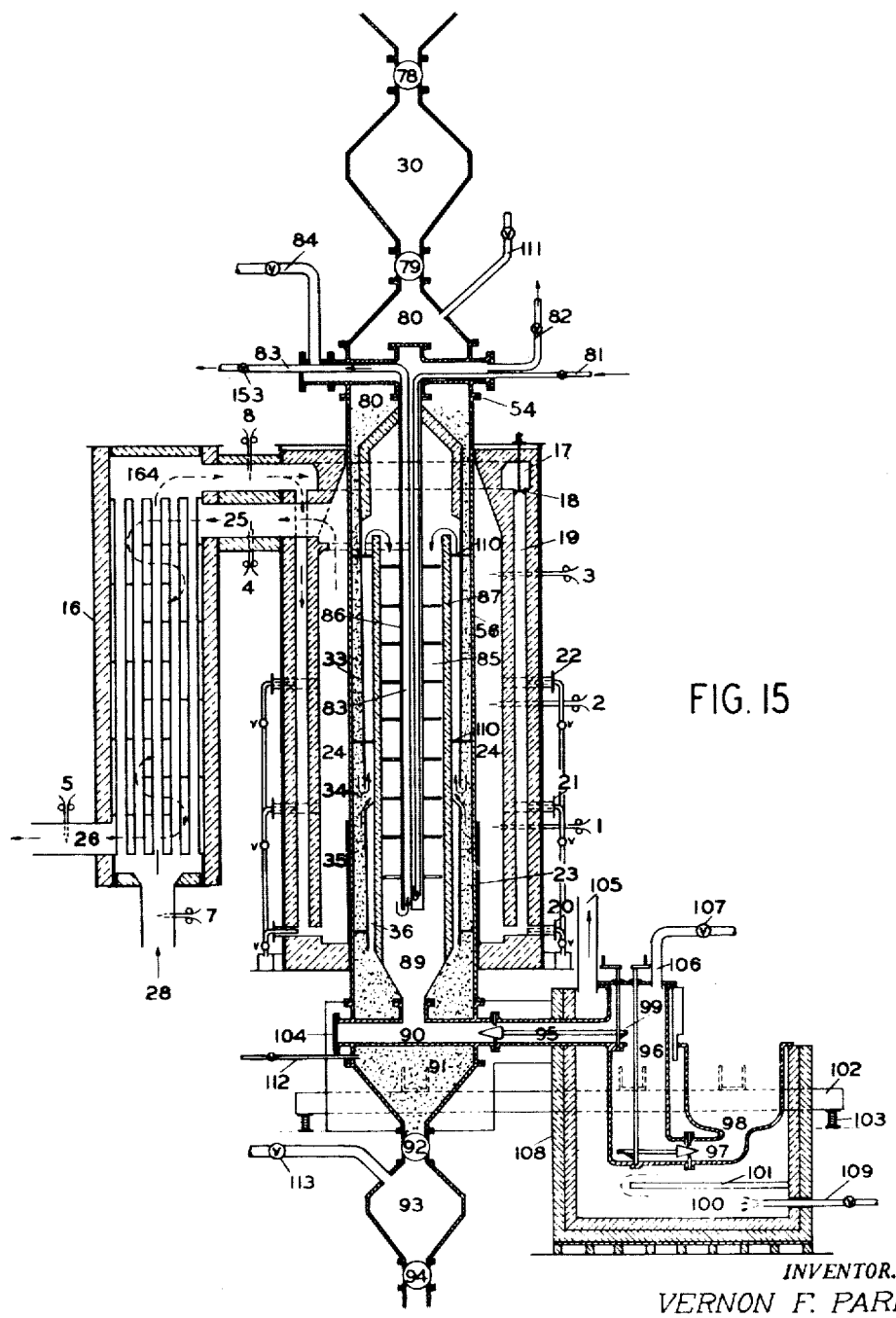

Figure 15 is a sectional view, partly diagrammatic showing the apparatus suitably modified to provide for the continuous reduction of metallic ores wherein the reduced metal is vaporizable at the temperature of reduction and is recoverable through a suitable internal condenser.

Figure 16 is a view, partly in section and partly diagrammatic, showing an optional arrangement of the combustion system involving direct recirculation of products of combustion.

Figure 16a is an enlarged view, partly in section and partly diagrammatic, showing the gas duct and air-cooled fan assembly of Figure 16.

Figure 16b is an enlarged diagrammatic view of the air-cooled fan.

The following brief description explains a procedure for making gas from undried subbituminous coal by the method outlined in this invention. Referring to Figure 3, freshly mined subbituminous coal containing about 22 per cent moisture is charged into the top of the apparatus and directed downwardly by gravity through annular preheating and reaction zones. Steam is mixed with the coal and reaction begins as the temperature increases. The products of reaction are removed from the interior of the annular reaction zone and give up a substantial portion of their sensible heat to incoming reactants. Solid materials not combined with reactants in the upper zone are then directed downwardly where they contact cooling gases which transfer heat from the solids back toward the center of the system, and the spent solids are discarded at a low temperature. Thus, heat for carrying out the gasification reactions is retained near the center of the system, and products leave at low temperature which insures high efficiency. In gasifying undried subbituminous coal, up to 95,000 gross cubic feet of water gas is obtained per ton of coal treated. The spent residue contains only 2 to 10 per cent of the carbon originally present in the raw coal charged. Part of the gas made may be directed back for heating the reaction vessel or suitable producer gas may be generated from spent solids to supply heat for the reactions. The combustion system is arranged to return heat to the high-temperature zone and to recover substantially all the heat from the evolved gases.

For a practical embodiment of the invention, and referring now to the drawings, an elongated vessel 56 which may be vertically mounted as shown, is provided near its upper end with a suitable device for feeding solid materials later to be described, and is closed at its lower end by a suitable closure device forming a part of the supporting means for the vessel 56. As shown in Figures 1, 2, 3 and 4, the closure device is an inverted conical annulus 130 or a flat circular cup as shown in Figure 12. The vessel 56 may have any desired cross-sectional form, but it is preferably made circular in order to simplify construction. Connecting the conical discharge annulus 130 and the vessel 56 is an expansion joint seal 55, which may be of the flanged or ring type. The conical annulus 130 or flat circular cup 74 is supported by suitable adjustable resilient mounts 49 or 49a which may take the form of springs or hydraulic jacks (not shown) adapted to exert an upward pressure against the force of gravity and to maintain any desired stress condition in the vessel 56.

Connected to the conical annulus 130 is a device for discharging spent solid material while maintaining a gas-tight seal. As shown in Figure 4, the device comprises a pair of oppositely rotating serrated cylinders or star feeders 48. Below the cylinders 48 is a butterfly valve 131 for causing solids to be vented into a water-seal 176. The seal 176 is provided with a drag conveyor 50a. Alternatively, the discharging device as shown in Figure 2 may, take the form of a rotary vapor sealing valve 48a of the paddle wheel type in conjunction with a water-filled screw conveyor 50. A further modification of the discharging device, shown in Figure 12, may take the form of a flat circular cup 74 supporting the vessel 56 having a revolving curved paddle scraper 63 to take solids from the periphery and to discharge them through the central duct 67 where they are fed to a screw conveyor 50 communicating with a gas producer 59. The hot carbonaceous solids are cooled by introduction of a cooling gas or liquid through cooling ports 70 in the conveyor 50. When water is used for cooling, an effective gas seal for moderate pressures is obtained between the vessel 56 and the gas producer 59. In operating this form of discharge, the scraper 63 is turned by vertical shaft 68 and pinion 69, which may operate at variable speed to adjust the rate of discharge suitably correlated with the driving pulley 88 for the conveyor 50. A further modification of the discharge device, shown in Figure 13, may take the form of a sloping screw conveyor 50 driven by a variable speed motor (not shown) attached to drive pulley 88. Dry material can be removed by this device at constant rate depending upon the speed of the screw 50 conveyor. Sealing is accomplished by introduction of cooling water in ports 70. The packing gland 77 which is similar to that shown in Figure 12a, can be adjusted to compensate for expansion of vessel 56. A further modification of the discharging device, shown in Figure 15, may take the form of a hold-up receiver 93 provided with a suitable inlet vapor sealing valve 92 communicating with the vessel 56 and an outlet vapor sealing valve 94 discharging the contents of the hold-up receiver 93. For operation at a pressure substantially different from atmospheric, the receiver 93 is provided with a pressure-equalizing valve 113. In operating this form of discharging device, the valve 92 is opened while valves 113 and 94 are closed, and a portion of the contents of the vessel 56 are allowed to enter the receiver 93. Thereupon valve 92 is closed, venting valve 113 is opened, and discharge valve 94 is opened.

For the purpose of defining an annular reaction zone while removing the formed gaseous products with concurrent internal heat exchange, there is aligned within the elongated vessel 56 a suitable heat exchange device 58 defining with the vessel 56 an annular reaction zone 33. As shown in Figure 6, such a device is an elongated cylindrical annulus 58, spaced away from and aligned with vessel 56 or an elongated annulus, as shown in Figure 15, of reduced diameter at its lower end. In either case the annulus 58 is open at its lower end, and extends substantially the entire length of the vessel 56. Located within the reaction zone 33 are positioned a plurality of spaced temperature-responsive elements 9, 10, 11, and 14 for indicating temperatures on recording devices (not shown), and to aid in controlling reactions later to be described. Preferably, the temperature responsive elements 9, 10, 11, and 14 are supported on the heat exchange device 58. Surrounding the upper portion of the cylindrical annulus 58 is a vent pipe 41 for removing gaseous products from the heat exchange zone 40 within the cylindrical annulus 58.

Suitable means are provided for conducting evolved gases from the reaction zone 33 into the heat exchange zone 40, being shown in Figure 6a as a plurality of circumferentially-spaced louvers 129 in the cylindrical annulus 58. Alternatively, the gas-conducting means may take the form of a plurality of slots 60 as shown in Figure 6.

Optionally, as shown in Figure 5, the cylindrical annulus 58 may be formed of a plurality of spaced overlapping frustro-conical annuli 132, whereby gas passes between the annuli 132. This form of the annulus 58 provides for removal of reaction gas throughout the entire length of the reaction zone 33, thus minimizing undesired decomposition.

For the treatment of solids which tend to swell or do not shrink substantially during treatment, the cylindrical annulus 58 is preferably made progressively smaller in diameter toward its lower portion, as shown in Figure 15, thus making the annular space 33 of increasing width progressively toward the bottom in order to facilitate free gravitational flow of solids downwardly through the reaction zone 33.

Suitable means for feeding solid materials, alone or admixed with liquid or gaseous substances, are provided near the upper end of the vessel 56. As shown in Figure 2, such means may comprise a conveyor or skip hoist (not shown) leading to a hopper 30. From the hopper 30 the solid feed material passes downwardly by gravity through vapor sealing cone valves 31 into a preheating zone 80 in the vessel 56 as shown in Figures 2, 3 and 4. The cone valves 31 are actuated by means of suitable wheels 32. Other suitable means for introducing solids continuously into the top preheating zone 80 may be used. Optionally, as shown in Figure 15, for operation at a pressure substantially different from atmospheric, pressure retaining valves 78 and 79 may be employed for admitting materials from the hopper 30 to the interior of the vessel 56.

Upon entering the vessel 56 a relatively large body of incoming solid materials is held up in the preheating zone 80 defined by the vessel 56 and the vent pipe 41, whereby heat is taken up by the solids from the evolved gases passing in indirect countercurrent heat exchange relationship to the solids.

If desired, suitable means are provided for admitting gaseous or vaporous materials to the preheating zone 80 in the upper portion of the vessel 56. As shown in Figures 2 and 3 an inlet pipe 38 is connected to an annular jacket 39 positioned in the heat exchange zone 80 surrounding the vent pipe 41 whereby the hot gases issuing through the vent pipe 41 serve to pre-heat the incoming vapors. The jacket 39 is provided with suitable openings near the lower portion thereof or is merely left open at the bottom, as shown, so that steam or other gaseous reactant is admixed in the preheating zone 80 with the solid materials. The preheating zone 80 is suitably lagged or otherwise insulated against heat losses by a heat insulating layer 133.

For many chemical reactions involving solid and gaseous or vaporous reactants, it has been found that a plurality of internal heat exchange devices mounted in the common elongated vessel 56 provides a superior annular reaction apparatus, particularly where it is desired to carry out a multiple-stage reaction involving concurrent treatment of solids and gases in a first annular reaction zone and countercurrent treatment of solids and gases in a second annular reaction zone. A suitable form of apparatus particularly shown in Figures 1, 2, 3, and 4, comprises a cylindrical annulus 58 occupying the upper portion of the elongated vessel 56 aligned therein and surmounting, but spaced from a lower cylindrical annulus 36. As shown, the lower cylindrical annulus 36 is capped by a conical closure 134. The wall of the lower cylindrical annulus 36 defines with the wall of the elongated vessel 56 a second or lower reaction zone 35 in which solids may react with or evolve gases or vapors. The bottoms of both the annulus 58 and the annulus 38 are open to permit free gas passage. The lower portion of annulus 58 and the conical closure 134 of the annulus 36 define a throat 34 for permitting escape of gases from the reaction zones 33 and 35 into heat exchange zone 40.

Optionally, suitable means for measuring the temperatures prevalent in the annular reaction zone 35 may be provided, and as shown, a temperature responsive device 14 may be suitably positioned to indicate reaction temperatures. Where it is desired to introduce gases or vapor into the lower heat exchange zone 135 or into the interior of the cylindrical annulus 36, such gases or vapors may be suitably introduced by way of an inlet pipe 37. For some reactions, such as gasification of chars from non-coking coals, superheated steam or gases may be introduced into the reaction zone 35 as shown in Figure 12, by passing the vapors through a preheating device 61 located in the combustion chamber 24. When operating in this manner gases or vapors are introduced into inlet pipe 37 and are preheated preferably in a coil or annular jacket 61 mounted on the walls of combustion chamber 24, and are thence passed into the vessel 56. As shown in Figure 12a, the inlet pipe 37, in entering the vessel 56 is packed in a packing gland 177 by a rammed packing 178.

An alternative arrangement of apparatus to secure transfer of heat from the evolved gases and vapors in the upper heat exchange zone 40 may be secured, as more particularly shown in Figure 7, by passing the incoming gases or vapors going into the lower heat exchange zone 135 through an inlet pipe 62 communicating with a source of gaseous reactants, and through a heat exchanger 64 positioned in the upper heat exchange zone 40, and thence into the lower cylindrical annulus 36.

For some reactions, particularly the production of oil from oil bearing shales or high volatile non-coking coals, it may be desirable to recirculate a portion of the fixed gases evolved from the upper heat exchange zone 40 into the lower heat exchange zone 135. As shown more particularly in Figure 8, this may be accomplished by passing the evolved gases or vapors through a suitable condensing device 66, a recirculating pipe 136, and a regulating valve 137, to return the gases through the inlet pipe 37. By this means, a large quantity of carrier gas can be passed through the reaction apparatus in direct contact with the solid reactants to provide for more rapid transfer of heat and removal of evolved products as well as to repress formation of fixed gases.

In some multiple-stage reactions, for example in the successive distillation and gasification of oil-bearing shales or non-coking coals, an intermediate cylindrical annulus 138 as shown in Figure 9 serves to permit the withdrawal of intermediately-formed gases or vapors. In Figure 9, the upper cylindrical annulus 58 and the lower cylindrical annulus 36 are shortened to provide space in the vessel 56 for a similarly aligned intermediate cylindrical annulus 138. The intermediate annulus 138 (Figure 9) is spaced apart from the vessel 56 to define an intermediate reaction zone 155, and is open at the bottom and spaced apart from a lower conical closure 134 to form a throat 34 for collecting evolved gases in the intermediate heat exchange zone 159. Capping the intermediate cylindrical annulus 138 is a conical closure 156 which is connected to and provides a seat for a vertical vent pipe 157 passing upwardly through the upper heat exchange zone 40 and thence out of the vessel 56.

Associated with the elongated vessel 56 are novel heating means for supplying necessary endothermic heat to carry out the reactions taking place in the annular reaction zones 33, 35, and 155. As shown in Figure 3, such means may take the form of a combustion chamber having an outer casing 139 associated with a recuperator having an outer casing 16 for recovering heat from combustion gases, an exhaust fan 143, a fresh air duct 27 or alternately 15, and suitable adjustable means including a valve 146 for recirculating a proportion of flue gases or P. O. C. (products of combustion) to the combustion chamber as a tempering medium for controlling flame temperatures in the combustion zone 24 heating the vessel 56.

The combustion chamber outer casing 139 (Figures 1, 2, 3 and 4) has a suitable base structure 171 and bottom closure 170 mounted therein, embracing the vessel 56 in a gas-tight sliding fit. The top of the casing 139 has a cap 140 embracing the upper portion of the vessel 56 in gas-tight sealing engagement therewith. The casing 139 is provided with an insulating refractory lining 57 through which extend a series of tangential burner ports 20, 21, and 22 shown in detail in Figure 14. The tangential burner ports 20, 21, and 22 are mounted in the outer casing 139 at different levels and direct burning fuel into the combustion zone 24 around the vessel 56. A series of vertically ranging gas passage ducts 19 identified by ducts A, B, C, D, E, F, G, H, I, J, K and L of Figure 14a are formed in the lining 57 and supply a preheated mixture of air and recirculated products of combustion (P. O. C.) to tangential burner ports 20, 21, and 22. In Figures 14a and 14b, an arrangement of the tangential burner ports at two levels is indicated. In Figure 14a which represents a cross section through baffle 53 at C—C in Figure 1, an arrangement of twelve vertical ducts 19 is indicated by clockwise lettering from A to L. Such ducts are suitable for firing a medium sized combustion furnace. In a larger furnace a plurality of ducts would be provided to supply preheated air and products of combustion at different levels as the furnace increases in height, having about the same distribution at each level as that indicated in Figure 14b. Ducts 19 may be of any suitable shape and size to provide for required gas-flow. Referring to Figure 3, the refractory insulating material 57 outlining the combustion zone 24 within the outer casing 139, is preferably made of lightweight insulating refractory key brick but suitable plastic insulating refractories that can be cast in place may be used. A gas passage manifold 17 is formed in the lining 57 near the upper end thereof and provides a common source of supply for the ducts 19. Each duct 19 has an adjustable gas metering valve 18 which may be manually controlled as shown. Preheated air and P. O. C. mixture is supplied to the manifold 17 from the recuperator by a horizontally ranging inlet duct 160 connecting the recuperator and the manifold 17.

In the combustion zone 24 (Figure 3) a flame guard 23 extends from the bottom closure 170 or from the top of the refractory bottom lining upwardly toward burner ports 21 and embraces the vessel 56 to protect it from excessive local heating. A horizontally ranging deflecting baffle 53 is located in the upper portion of the combustion zone 24 below a discharge flue 25 to cause combustion gases to travel completely around the vessel 56.

A flue 25 in the casing 181 connects the upper portion of the combustion zone 24 above the baffle 53 with the recuperator and serves to conduct combustion gases from the combustion zone 24 to the recuperator as shown in Figures 1, 2, 3 or 4.

The recuperator comprises an outer casing 16 mounted upon a base 162 forming a bottom closure suitably supported by means not shown, and a cap 161 forming an upper closure. The outer casing 16 is provided with a suitable insulating refractory lining 163 to minimize heat losses. Vertically disposed in the casing 16 is a suitable tube bundle 166 supported by an upper tube sheet 167 and a lower tube sheet 168 (Figure 3). Suitable horizontal deflecting baffles 142 are disposed inside the casing 16 about the tube bundle 166 to provide for an elongated gas passage traveling about and through the tube bundle 166. The products of combustion issuing from the combustion zone 24 through the flue 25 enter the recuperator below the upper tube sheet 167 and pass downwardly about the tube bundle 166 (Figure 3). They are removed from the recuperator through a flue 26 after giving up their heat and are thence passed through an exhaust fan 143 into a stack juncture casing 169. A lower header 165 is formed in the lower portion of the casing 16 and is adapted to distribute incoming air and P. O. C. through the interior of the tube bundle 166. An upper header 164 is formed by the upper tube sheet 167 and passes fresh air and recirculated products of combustion into the inlet duct 160. The stack juncture casing 169, upon which is mounted the stack 52, is provided with a stack valve 145. The casing 169 also has a valve 146 through which a controlled proportion of products of combustion can be recirculated to the system. Connecting the fresh air inlet 27 and the stack juncture 169 is a juncture 27a for admixing recirculated flue gases with fresh combustion air. Connecting the recuperator lower header 165 and the juncture 27a is a duct 28 through which fresh air and a controlled proportion of combustion products may be sent through the tube bundle of the recuperator.

Optionally, suitable means for introducing air into the system is through inlet duct 15 forming a junction with duct 26 in advance of exhaust fan 143. Fresh air introduced at this point serves to cool the fan blades. The fresh air and P. O. C. mixture handled by the fan is circulated back through the system through duct 28, and part is discarded to the stack 52 by regulation of valves 145 and 146.

Optionally, suitable means are provided for removing additional waste heat from the stack gases and concurrently drying and preheating the solid feed material to the vessel 56. As shown in Figure 4, such means comprise an annular gas conducting jacket 115 surrounding the upper portion of the elongated vessel 56 projecting from the cap 140 and adapted to receive flue gases from the modified stack 52. Engaging the upper portion of the jacket 115 is a suitable flue 116 adapted to remove the flue gases issuing from the annular jacket 115. Associated with the flue 116 is an auxiliary combustion chamber 117 adapted to provide additional heat to the combustion gases for drying the solid feed material as next to be described.

Surmounting the elongated vessel 56 (Figure 4) in this modified form of the apparatus is a drying chamber 114 adapted to provide intimate contact between the solid feed material and flue gases. The flue 116 conducts gases from the jacket 115 and the auxiliary combustion chamber 117 into the drying chamber 114 at a controlled temperature indicated by temperature responsive element 118. Horizontally disposed in the drying chamber 114 are a plurality of inverted metallic deflecting angles 154 shown in detail in Figure 4a. The angles 154 are adapted to provide gas passages for the flue gases through fine-size solid feed material, and the spent gases leave through duct 184.

Optionally, if the solid material being treated is of close-graded size through which gases will flow with only moderate pressure drop, by closing valve 183 and opening valve 78, the heating gases are deflected from the bottom of the metallic deflecting angles 154 (Figure 4) are forced to leave the system by passage through the broken solid material. This system of operation provides more contact surface and the heat is transferred very efficiently. If desired, moist carbonaceous materials may be previously dried with high-pressure saturated steam before entering the system.

In the operation of the heating system or device associated with and forming a part of the reaction apparatus, fuel from gas header 51 (Figure 4) is burned at the burners 20, 21, and 22 in controlled amounts. The highly heated products of combustion ascend and swirl about the vessel 56. They are then directed past the horizontally ranging baffle 53 through the flue 25 into the recuperator outer casing 16. In the recuperator casing 16 the products of combustion pass downwardly in indirect countercurrent heat exchange relationship with incoming tempered air and P. O. C., being directed through the recuperator in an elongated path by the baffles 142, and give up a substantial portion of their sensible heat. Issuing from the recuperator near the lower portion thereof, the partially cooled products of combustion pass by way of the flue 26 through the fan 143 into, respectively, the stack 52 and the fresh air duct 27 in accordance with the arrangement of the gas-flow regulating valves 145 and 146. Fresh air or other source of oxygen for combustion enters through the air duct 27, is mixed with a predetermined quantity of combustion products at the juncture 27a, and the diluted or tempered air then passes through the flue 28 back through the recuperator 16 and into the combustion chamber manifold 17. Optionally, fresh air may be introduced into the system through port 15 in duct 26 just in front of the fan as previously described. From the manifold 17 the tempered and partially preheated air passes downwardly through the metering valves 18 into the preheating ducts 19 and thence to the burners 20, 21, and 22, in suitably metered amounts. As shown, the preheating ducts 19 are in indirect countercurrent heat exchange relationship with the combustion zone 24 and the contained upwardly-moving products of combustion. By this arrangement and correlation of parts, a very desirable uniformly-controlled heating is secured for the elongated vessel 56 and the heating is carried out with very high thermal efficiency.

In operating the preheating and heat interchange devices for drying, roasting, or further abstracting heat from the products of combustion issuing from the stack 52, or duct 192, the products of combustion pass from the stack 62 into the heat exchange jacket 115 and give a portion of their heat to the reactants in the preheating zone 80. Thereupon, the partially cooled products of combustion pass through the flue 116, are optionally mixed with additional products of combustion generated in the auxiliary combustion chamber 117, and thence are passed into the preheater or dryer 114. Through the interstices formed in the solid material bed by the members 154, the combined products of combustion give up their heat to the solid materials and suitably preheat and dry the feed material passing to the preheating zone 80 from the hopper 30.

Optionally another form of the heating system is illustrated in Figures 16, 16a and 16b. The combustion system in casing 139 is the same as that previously described but the recuperator is omitted and replaced by a specially built fan for recirculation of highly heated products of combustion. The fan 185 is mounted on a platform 198 supported by brackets 197 and connected to the shell casing 139. It is constructed of material adapted to withstand high temperatures and is insulated by a suitable insulating layer 194. A plurality of hollow blades 190 are mounted on a hollow shaft 188 extending into the fan casing 200. The hollow shaft 188 is carried by suitable outboard bearings 195 which are placed away from the heat on a suitable mounting. The shaft extends into an air junction box 186 and is driven by pulley 196, connected to a suitable prime mover (not shown).

In the operation of this optional heating system or device associated with and forming a part of the reaction apparatus (Figure 16), fuel is burned at the tangential burners 20, 21, and 22 in controlled amounts. The highly heated products of combustion ascend and swirl about the vessel 56 and are directed past the horizontal baffle 53 through the flue 25 partly into the recirculating fan 185 and partly into the duct 192. The fan picks up a predetermined volume of products of combustion for return to the system through manifold 17, and also takes fresh air into the system for admixture with products of combustion. Fresh air, regulated by valve 187, is introduced into or drawn through air metering box 186 and passes through the hollow shaft 188 into the hollow fan blades 190, where it emerges through ports 189, preferably located on the trailing edge of the blades, and mixes with products of combustion. The fresh cooling air traveling at high speed through the hollow shaft and blades cools the metal and allows the fan to operate in the envelope of highly heated products of combustion. The discarded products of combustion passing through duct 192 enter a countercurrent heat exchange device 149, where they give up the major portion of their heat to gases or vapors used in the reactions carried out in the reaction vessel 56. The gases or vapors are introduced into the heat exchange device 149 through port 179, and they leave through port 180. Optionally the discarded products of combustion may be used for predrying or roasting solids as previously described and illustrated in Figure 4.

*Process for distillation in single annulus*

In the operation of the apparatus for distillation of carbonaceous materials when employing a single elongated heat exchange device 58 within the housing 56 illustrated in Figures 5 and 6 mounted in the setting of Figure 4, solid feed material, such as lignite, non-coking coal, or oil-shale, is suitably fed to the hopper 30 and passed downwardly through the preheater 154 and valve 31 into a further preheating zone 80 surrounding the outlet 41 and the upper portion of the extended housing 56 surrounded by the annular jacket 115. There the solid materials reach a temperature between 212 degrees F. and 500 degrees F. (100 degrees C. and 260 degrees C.) taking up heat from evolved gases and from P. O. C. circulating in the jacket 115. The solids then pass downwardly by gravity into the annular reaction zone 33 defined by the vessel 56 and the concentric heat exchange device 58. As the solid materials pass downwardly through the annular reaction zone 33, reaction is initiated, and distillation proceeds to the desired point indicated by the temperature responsive elements 9, 10, 11 and 14. The evolved gases and vapors are suitably vented through ports 60 of Figure 6, or annular vents 132 of Figure 5, from the annular reaction zone 33 into the heat exchange zone 40, whereupon they reverse their direction of flow and proceed upwardly in countercurrent heat exchange relationship to the descending solids in the annular reaction zone 33 creating a Venturi effect which aids the flow of gases through orifices 60. The spent solid materials such as char or spent shale continue downwardly to the solids discharging device 48 of Figure 4, or optionally to the valve 48a of Figure 2, or to the water seal device 50 (Figure 4) from which they are removed by the drag conveyor 50a or the screw conveyor 50, as the case may be.

When distilling carbonaceous materials for recovery of primary tar-oils and gases, the solid materials, such as coal, are heated to about 1100 degrees F. or 600 degrees C., but when distilling oil-shale for recovery of maximum oil, it is not necessary to heat the shale higher than about 700 degrees F. to 950 degrees F. (370 degrees C. to 510 degrees C.), as indicated by temperature responsive element 14 (Figure 4). Higher temperatures than those cited above can be used but they will decompose more tar and oil vapors to fixed gases approximately in proportion to the change in absolute temperature.

The evolved gases and vapors issuing from the vent pipe 41 are suitably treated in accordance with their source or composition to render them most suitable for their intended purposes. For example, in the case of shale distillation for the production of oil and fixed gas, they are conducted into a fractional condensing device which may take the form of a bubble column 66 as shown in Figure 4. In this column 66, equipped with bubble caps 121, the heavier oily substances produced are condensed, and the lighter fractions are conveyed through the pipe 125 into a condenser 126 for the separation of the more volatile condensible substances. From the condenser 126, the light fractions are collected in a receiver 128. In the bubble column 66, suitable vents are placed at spaced positions along the column to remove intermediate fractions, and as shown, these vents may take the form of a plurality of valved outlets 120, 122, and 123. If desired, reflux condensate may be admitted near the upper portion of the column at the inlet 124 and steam may be admitted near the base of the column through the inlet 203 to balance the slight additional heat as required. Heavy condensate may be removed from the condenser 66 at the base thereof and collected in the receiver 204.

Process for distillation in double annulus

In the operation of the apparatus provided with two superposed annular heat exchange devices in accordance with a preferred embodiment of the invention for distillation of non-coking carbonaceous materials as illustrated in Figures 4 and 8; solid preheated materials, preferably size-graded and containing a minimum of fine sizes, pass downwardly as previously described through the first annular reaction zone 33, and are raised in temperature close to that of initial thermal decomposition. When treating non-coking coals, the temperature of initial decomposition is 650 degrees F. to 750 degrees F. or 340 degrees C. to 400 degrees C. Therefore in practical operation, the combustion and preheating systems are adjusted to produce a developed temperature of about 700 degrees F. as indicated by temperature responsive element 10 placed near the center of the lower part of the reaction zone 33. The vertical positioning of throat 34 is designed to meet these conditions, but for all practical purposes, throat 34 is located about two-thirds the height of the combustion chamber 24. Water vapor or initial products of thermal decomposition forming in the reaction zone 33 pass concurrently with the solid material and pass into the heat exchange zone 40 through the throat 34. The solid materials now preheated to about 700 degrees F. pass downwardly by gravity through the annular reaction zone 35 defined by the lower heat exchange device 36 and the elongated vessel 56. As the solid materials pass downwardly through this reaction zone 35, they increase in temperature as indicated by temperature responsive elements 9 and 14 located about in the center of the reaction zone outlined by annulus 36 and reaction vessel 56. Low temperature distillation of the volatile hydrocarbons from coal takes place between 750 degrees F. and 1200 degrees F. (400 degrees C. to 650 degrees C.), and, when the external combustion system is suitably regulated to produce a temperature of about 1200 degrees F. (650 degrees C.) as indicated by temperature responsive element 14, the maximum yields of primary low temperature tars are obtained. On the other hand, if it is desired to obtain more fixed hydrocarbon gases at the expense of lower tar or oil yields, the combustion chamber 24 is advanced in temperature to the desired point to yield the kind and quality of products wanted. As the solid reactants pass downwardly through reaction zone 35, evolved gases and vapors or reactant gases or vapors pass countercurrently to the solids whereby heat is transferred to the upper solid materials. Heat transfer by this mechanism may be aided by introducing carrier gases, recirculated distillation gases, steam, or other vaporous materials through the lower inlet pipe 37 suitably positioned in the heat transfer zone 135. These carrier gases pass upwardly through reaction zone 35, extracting heat from the downcoming solids and from the lower wall of reaction vessel 56 and transfer the heat to material higher up in zone 35. Thus the solids materials discharged from vessel 56 have only a relatively low temperature in comparison to the maximum temperature obtained in the reaction zone. Evolved gases and vapors emerging from zone 40 leave the system through vent pipe 41 and are condensed as previously described.

Optionally when distilling oil-shale with two superposed annular heat exchange devices in accordance with a preferred embodiment of the invention illustrated in Figure 4, the system is operated in the same manner as that previously described for non-coking coal, but the temperatures inside the lower reaction zone 35 are carried somewhat lower than when distilling coal. It has been found that it is only necessary to heat oil-bearing shales to about 700 degrees F. to 950 degrees F. (370 degrees C. to 500 degrees C.) in order to extract the optimum quantity of potential condensable oil. The combustion system temperature or the rate of movement of the shale through the system is adjusted to produce the above temperature conditions inside the reaction zone 35 as indicated by the temperature responsive element 14. Optionally, greater yields of fixed hydrocarbon gases can be obtained at the expense of lower oil yields by advancing the temperature of reaction zone 35 as indicated by temperature responsive element 14 or by the temperature responsive element 1 located in combustion chamber 24.

As an example of test results obtained in the operation of the double annulus system for distillation of oil-bearing shale, the following experimental data were obtained during test in a small pilot plant similar to Figure 4:

| | |
|---|---|
| Shale charging rate, pounds per hour | 347 |
| Spent shale discharging rate, pounds per hour | 266 |
| Oil distilled from shale, pounds per hour | 59.7 |
| Air introduced as carrier gas at inlet 37, cu.ft./hr | 300 |
| Distillation gas recirculated, through 37, cu.ft./hr | 723 |
| Net yield of gas from system, cu.ft./hr | 505 |
| Heat required for distillation, B. t. u./pound of shale | 685 |
| Potential heat in gas made, B. t. u./pound of shale | 780 |
| Temperature, bottom of combustion chamber at point 1, °F | 1785 |
| Temperature, middle of combustion chamber at point 2, °F | 1490 |
| Temperature, top of combustion chamber at point 3, °F | 1180 |
| Temperature of P. O. C. out recuperator at point 5, °F | 595 |
| Temperature of vapors leaving retort at point 12, °F | 415 |
| Temperature of shale in reaction zone at point 14, °F | 855 |
| Temperature of spent shale leaving reaction zone 35, °F | 640 |
| Temperature of shale leaving preheater 30, °F | 130 |
| Temperature of vapors at throat 34, °F | 580 |
| Potential heat discarded in spent shale, B. t. u.; lb. dry | 1790 |

During the above test 26,377 pounds of shale were distilled and 4488 pounds of oil was recovered over a test period of about 76 hours.

Process for distillation and gasification in multiple annuli

In the operation of the apparatus or system provided with a plurality of annular heat exchange devices in accordance with a preferred embodiment of the invention for distillation and complete gasification of solid non-coking carbonaceous materials, reference is made to Figure 9. Solid materials, suitably dried or preheated as previously described in the discussion referring to Figure 4, pass downwardly into reaction zone 33 and into the intermediate reaction zone 155, where they undergo thermal decomposition and distillation in accordance with the mechanism previously described for the double annulus heat exchange system. For example, products of initial decomposition pass concurrently with the solids in reaction zone 33, whereas the evolved tars, oils, vapors, and grease issuing from the intermediate reaction zone 155 pass countercurrently to descending solids and emerge through throat 158 to leave the system through duct 41. This circuit is arbitrarily called the rich-gas circuit, and it confines oil vapors and relatively high heating value gases. Carrier gases generated in the lower reaction zone 35 enter the reaction distillation zone 155 and move countercurrent to descending solids and materially improve heat transfer to solids above. Solid materials, free of volatile condensible hydrocarbons, but containing some gaseous volatile matter, enter the lower reaction zone 35 where they undergo decomposition by reaction with steam or other reactant gases such as $CO_2$ aided by heat extracted from the lower part of reaction vessel 56 and by any heat impressed in the reacting vapors or gases by passage through a preheater 61 not shown in Figure 9 but described in relation to discussion of Figure 12. To solid reactants moving downwardly countercurrent to ascending gaseous reactants in reaction zone 35 reach thermo-chemical equilibrium, and gas formation is maintained at balanced reaction rates governed by the rate of heat transfer through the vessel 56 and the preheater 61 (Figure 12). The water gas reactions occurring in this section are endothermic, and their equilibrium can be adjusted by regulation of both steam concentration and temperature. It has been found that by regulating combustion chamber temperatures indicated by temperature responsive element 1 within the range 1800 degrees F. and 2150 degrees F., and by adjustment of steam input to the system within the range 0.2 to 3.5 pounds per pound of solid material entering the reaction zone, that water gases having compositions expressed by $H_2/CO$ ratio ranging from 1.5 to 12.0 can be produced. Optionally, by introduction of regulated quantities of $CO_2$ introduced and preheated with the steam product gases formed in reaction zone 35 can be controlled to have $H_2/CO$ ratios ranging down to less than 1.0. Gases formed in the above described process pass in countercurrent heat transfer relationship with the descending solids in reaction zone 35 and emerge through throat 34 into the intermediate heat exchange zone 159. This circuit constitutes the lean gas circuit, and products leave the system through vent pipe 157. Optionally part of the gases formed in reaction zone 35 are drawn through the intermediate reaction zone 155, where they serve as carrier gases in the rich gas circuit as previously described in connection with the double reaction zone system. Solid refuse or materials containing fixed carbon and ash move downward and out of the reaction zone 35 and are discharged from the reaction vessel 56 as illustrated in connection with Figure 12. The revolving scraper discharge 63 moves the solid carbonaceous residue into duct 67, where it is picked up by discharge screw conveyor 50 in which cooling is accomplished by water or steam introduced through ports 70. The residue is transferred to reaction vessel 59, where further and complete gasification is attained by the well known producer gas reaction attained either in the static or fluidized bed. Essentially carbon-free refuse is discarded from reaction vessel 59. The cooling agent introduced into discharge conveyor 50 serves to prevent admixture of gases or vapors introduced into zone 135 with producer gases made in reaction vessel 59. Gases issuing from reaction vessel 59 pass through duct 71, through dust catcher 72, and thence into gas receiving bustle pipe 51 from which they are distributed to the furnace heating the reaction vessel 56. Thus distillation and complete gasification of solid materials is attained, and in coming natural fuels are converted or upgraded at high efficiency into the following classified products: (a) low temperature tar oil; (b) rich gas having a heating value greater than 325 B. t. u. per cubic foot; (c) lean water gas having a heating value less than 325 B. t. u. per cubic foot suitable for production of synthetic liquid fuels or for other purposes. The quality of the lean gas can be varied and controlled such that its major constituents $H_2$ and CO can be varied to suit conditions of use.

*Process for complete gasification in double annulus*

In the operation of the apparatus or system provided with two superposed annular heat exchange devices or reaction zones in accordance with a preferred embodiment of the invention for complete gasification of non-coking carbonaceous materials reference is made to Figures 1, 2 and 3. Solid preheated reactive materials, preferably size-graded and containing a minimum of fine sizes, pass downwardly with gaseous reactants such as steam or $CO_2$ introduced into the system at inlet 38 as previously described by the vessel 56 and the aligned heat exchange device 58. As the solid materials and reactants pass downwardly through the annular zone 33, reaction is initiated, and the evolved gases or vapors and reactants pass concurrently with the descending solids. The temperature of gases, vapors, and solids in the annular reaction zone 33 increases as the solids advance down the annulus as indicated by temperature responsive elements 11, 10 and 9, so placed that the thermocouple junctions are about midway between the inner top cylindrical annulus 58 and the wall of the reaction vessel 56. The temperature in the annular reaction zone 33 is controlled to lie within the range 1200 degrees F. and 2000 degrees F. (650 degrees C. and 1100 degrees C.) at the point indicated by the temperature responsive element 9. The mechanism of distillation, decomposition, and gasification occurring in the annular reaction zone 33 has been observed to be as follows. Primary or low temperature distillation occurs in the upper part of the annulus in the temperature range 750 degrees F. to 1100 degrees F. (400 degrees C. to 600 degrees C.), in which water, $CO_2$, condensable oils, and high molecular-weight hydrocarbon gases are the principal volatile products. As the temperature advances between 1000 degrees F. to 1300 degrees F. (540 degrees C. to 700 degrees C.) secondary decomposition of hydrocarbons occurs to form lighter weight hydrocarbon molecules, and reactions between steam, $CO_2$, hydrocarbons, and solid carbon are initiated, in which hydrogen is a principal product. Residual volatile matter in the form of $H_2$ also is eliminated from the solid residue in the temperature range 1000 degrees F. to 1300 degrees F. (540 degrees C. to 700 degrees C.). As this complex mixture of reactants increases in temperature from 1200 degrees F. to 2000 degrees F. (650 degrees C. to 1100 degrees C.), hydrocarbons are decomposed and reduced to their elemental state, and they contribute their share by partial pressure to the equilibrium attained by reactions proceeding steam, $CO_2$, $CO$ and carbon to make up the well known water gas equilibrium. The composition of the product gases leaving the annular reaction zone 33 through throat 34 depends upon the temperature and the concentration of principal reactants. Reactive solid materials and catalysts, such as iron oxide promote attainment of equilibrium at lower temperatures. It has been observed that by regulating the quantity of gaseous reactants, steam or $CO_2$ introduced at inlet 38, in the range from 0.2 to 2.0 pounds per pound of solids, and the temperature, as indicated by temperature responsive element 9, to range between 1200 degrees F. to 2000 degrees F. (650 degrees C. to 1100 degrees C.), product gases consisting of $H_2$, $CO$, $CO_2$, $CH_4$ and traces of $N_2$ can be produced such that their principal constituents, $H_2$ and $CO$, will be in ratio ranging from 1.0 to 12.0. As the temperature of the reaction vessel 56 is increased, the $H_2/CO$ ratio decreases, and optionally, the $H_2/CO$ ratio increases as the concentration of steam is increased. Thus product gases having $H_2/CO$ ratio ranging from 1.0 to 3.0 suitable for production of synthetic liquid fuels are produced at the higher temperature levels by the process outlined herein.

In the double annular heat exchange system, solid carbonaceous materials not entering into reaction in the reaction zone 33 descend by gravity into the lower reaction zone 35, where they contact gaseous and vapor reactants moving countercurrently to the solids. The lower portion of the upper heat exchange device 58 (Figure 3) is made to extend sufficiently far down the elongated vessel 56 so that, in general, the gaseous or vaporous products of reaction are removed from the annular reaction zone 33 near the zone of optimum temperature. The gaseous or vaporous reactants, suitably are oxyginated gas from the group of steam, air, oxygen and carbon dioxide, are introduced through inlet 37 into heat exchange zone 135 and thence into reaction zone 35. They may pass through suitable preheaters 29 or 61 (Fig. 12) located outside the reaction zone. Moving in countercurrent heat exchange relationship with descending solids, the gaseous reactants in zone 35 cool the outgoing solids and transfer heat back into the reaction zone where water gas reactions proceed at rates and under the equilibrium dictated by temperature of the reaction zone and concentration of the principal reactants. It has been found that, by controlling the maximum temperature as indicated by temperature responsive element 14 between the range 1200 degrees F. to 2000 degrees F. (650 degrees C. to 1100 degrees C.) and the amount of steam or other oxyginated gas introduced through inlet 37 to range within 0.2 to 0.3 pounds per pound of solids, product gases consisting principally of $H_2$, $CO$, and $CO_2$ leaving the reaction zone 35 can be controlled such that the major constituents, $H_2$ and $CO$, will be in ratio ranging from 1.0 to 12.0. Solid carbonaceous materials containing a relatively high percentage of ash are discharged from the reaction vessel 56 as previously described in connection with the discussion relating to Figures 9 and 12.

It will be apparent from the foregoing that the solid reactants traverse a temperature gradient proceeding from about 700° F. to a maximum of about 2000° F., and then back to about 700° F. in traversing the reaction zones as above described.

Thus, in this combined process of complete gasification of solid non-caking carbonaceous material, natural or protreated solid materials are upgraded and converted to water gases of controlled composition in a highly efficient manner. In order to balance the "system" for complete gasification of any non-coking coal, a procedure has been developed whereby the weight relationship of reactants and heat, required for the reaction are calculated from the analysis of the coal to fit the desired end products. Non-coking coals having oxygen contents greater than 10.0 per cent on the moisture and ash-free basis or those having hydrogen/oxygen ratios less that 0.60 on the moisture and ash-free basis are suitable for complete gasification in this process. In the scale of coal rank these include lignite up to non-coking, non-agglomerating bituminous coal. In further explanation of the manner of applying the invention or "system" for gasification of coal to make "synthesis gas" the following example of a case for ash-free steam-dried lignite is cited as an equation:

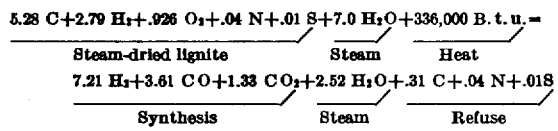

In the foregoing example the figures represent pound mole per 100 pounds of ash-free steam-dried lignite, except the B. t. u. figure, which represents the heat that must pass through the walls of the reaction vessel 56 to carry out the reaction when products leave the system at 1000 degrees F.

As a further example of the operation of the process of complete gasification of subbituminous coal in the double annulus system illustrated in Figure 3, the following operating data from a test in a pilot plant are cited:

| | |
|---|---:|
| Coal charged, pounds per hour | 54.3 |
| Moisture in coal as charged, percent | 21.5 |
| Ash in coal as charged, percent | 5.8 |
| Refuse out bottom of retort, pounds per hour | 4.3 |
| Ash content of refuse, percent | 31.0 |
| Tar or oil formed | 0.0 |
| Gas made, cubic feet per hour SGC | 2,045 |
| Analysis of gas made: | |
|     Carbon dioxide, percent | 17.9 |
|     Illuminants, percent | 0.3 |
|     Carbon monoxide, percent | 17.2 |
|     Hydrogen, percent | 61.4 |
|     Methane, percent | 2.7 |
|     Nitrogen, percent | 0.5 |
| Heating value of gas, B. t. u. per cubic foot, observed | 284 |
| Specific gravity of gas | .504 |
| Steam used in zone 33, pounds per hour | 52.0 |
| Steam used in zone 35, pounds per hour | 50.0 |
| Steam not decomposed, pounds per hour | 57.6 |
| Net heat used in combustion chamber 24, B. t. u. per hour | 325,000 |
| Products of combustion recirculated, cu. ft. per hour | 5,560 |
| Temperature of bottom of combustion chamber at 1, °F | 2050 |
| Temperature of middle of combustion chamber at 2, °F | 1900 |

| | |
|---|---|
| Temperature of top of combustion chamber at 3, °F | 1530 |
| Temperature leaving combustion chamber at 4, °F | 1390 |
| Temperature of P. O. C. leaving recuperator 5, °F | 755 |
| Temperature of air and P. O. C. returned to recuperator 7, °F | 385 |
| Temperature of air and P. O. C. leaving recuperator 8, °F | 1000 |
| Temperature of products leaving retort 12, °F | 770 |

The above data represent average of 24-hour operating during a test lasting about 100 hours.

Process for distillation of oil shale

This invention is also applicable to the distillation of oil-bearing shales comminuted to a suitable particle, for example as illustrated in Figure 4, the oil-bearing shales are passed through the annular reaction zone and are there suitably heated to a temperature between about 600 degrees F. to 950 degrees F. (325 degrees C. to 500 degrees C.) in which range substantially the whole of the oil content is liberated. Somewhat higher temperatures can be used, but under those conditions a much larger proportion of the hydrocarbon content of the shale is converted into fixed hydrocarbon gases. A desirable feature of this invention in connection with the distillation of oil-bearing shales is that a portion of the fixed gases, ranging up to several times the fixed gas formed, can be recirculated to provide a carrier gas. Optionally, steam can be admitted to the reaction annulus near its power portion to yield water gas from the residual carbon in the shale. Alternatively, a suitable quantity of carbon dioxide or oxygen plus steam can be admitted to yield a higher carbon monoxide and hydrogen content in the fixed gases resulting from shale distillation for use as synthesis gas.

Optionally by extending the length of reaction vessel 56 as indicated in Figure 13, a reaction zone 172 is provided wherein the above modification can be adapted.

A preferred process for distillation and gasification of oil-bearing shales combines the process and equipment just described for distillation of carbonaceous materials in the double annulus system illustrated in Figure 4 with the improved process hereinafter described for gasification of residual carbon in spent shale illustrated in Figure 13. Heretofore in less efficient processes for recovery of oil from oil-bearing shale, much potential heat is lost by discarding fuel values in the spent shale or by wasteful use of gases derived from the shale. By the process described herewith, in conjunction with the double annulus process of distillation previously described, a large portion of high heat value fixed gases can be produced from average shale for purposes other than process requirements. Spent shale, from which oil vapors have been removed as previously described, and containing 2.0 to 26 per cent by weight of fixed carbon plus volatile combustible constituents, can be further processed to recover additional fuel values by the device indicated in Figure 13. The heated residue from reaction zone 35 feeds by gravity into reaction zone 172 defined by an extension of reaction vessel 56. Air, steam, oxygen or carbon dioxide, or combinations of these gases, is introduced into inlet 199 and carried into the central portion of the reaction zone by duct 173. These gaseous reactants enter the reaction zone 172 through ports 174 and conical baffles 175, as indicated in Figure 13a. Combination of the oxygenated mixture with fixed carbon or residual volatile matter occurs, and the lean spent shale is gasified by the well known producer-gas type reactions. Combustible gases are generated at high temperature, and these ascend as carrier gases entering reaction zone 35, where they contribute both their sensible heat and potential heat to the process. By virtue of the central draft inlet, high temperatures are confined to the inner portion of reaction zone 172, and little heat is lost by radiation, although insulation layer 76 guards against further losses. Spent shale, now robbed of a substantial part of its potential heat, moves downward and is removed at the base of the reaction zone 172 by a suitable extraction device which may take the form of a sloping worm screw 50 equipped with quenching ports 70 which substantially seals the system and prevent loss of fixed gases from the reaction zones.

Other processes employing the annular retort principle

While the method and apparatus of this invention as previously particularly described relates to the gasification and distillattion of subbituminous coal or lignite and the recovery of oil from oil-bearing shale, nevertheless, the same reaction conditions and equipment can be utilized in the destructive distillation of any non-caking carbonaceous material such as for example non-coking or non-caking subbituminous or bituminous coals. The method and apparatus of this invention as generally applicable to the gasification of lower rank fuels where the fuels employed as feed materials contain more than 10 per cent by weight oxygen on a moisture and ash-free basis.

Process for making carburetted water gas continuously

The process and apparatus of this invention can readily be adapted to the production of carburetted water gas continuously from non-caking lower rank coals as above defined by suitably modifying the central reaction annulus as shown in detail in Figure 10 of the drawings, wherein a suitable means for introducing gas oil near the zone of optimum reaction temperature is shown. As shown, an oil feed pipe 201 depends into or is positioned in the interior of the upper heat exchange zone 40 and is provided with a nozzle 147 for spraying gas oil upon the incandescent bed of heated carbonaceous material situated between the lower edge of the upper heat exchange device 58 and the upper dome 134 of the lower heating exchange device 36. Additionally, a proportion of gas oil is introduced in the upper portion of the annular reaction zone 33 by means of suitable feed pipes 148. By this means, the gas oil feed to the initial lignite or other non-caking carbonaceous material being treated is first vaporized in the annular reaction zone 33 and is progressively heated to cracking temperatures as it approaches the zone of optimum temperature and is thus cracked into a fixed gas of high caloric content. This is supplemented by the gas produced when the oil spray from the nozzle 147 is likewise cracked on the incandescent fuel bed into a fixed gas.

Direct reduction of iron ore

For the continuous reduction of granular iron ores utilizing the annular reduction zone principle, lignite is suitably gasified as previously described in an externally heated annular reaction zone 33 and, as shown in Figure 11, passes into an inner annular reaction zone at the point of optimum temperature through the ports 34 shown on an enlarged scale in Figure 11a. The ports may take the form of elongated slots 74 as shown in Figure 11. To provide an inner reaction zone, through which iron ore to be reduced is passed, an elongated concentric member 202 is suitably positioned longitudinally inside the annular reaction zone spaced apart from the normal inner annulus to form a dual annular reaction space. Into the inner annulus, iron ore to be reduced is charged by a suitable inlet means 150, passes downwardly through the annular reaction zone countercurrently to gases evolved in the outer annulus as to be explained, and is passed out of the annulus at the bottom of the apparatus. Surrounding the annulus 73 in which the iron ore is reduced is an outer annular reaction zone 33 in which lignite is concurrently gasified by the process previously explained and near the zone of optimum temperature, the gasified lignite gives up its fixed gases which pass directly through throat 34 into contact with iron ore to be reduced. Through the steam inlet 151 communicating with the lower portion of the outer annulus 33, steam may be admitted to complete the gasification of the lignite and the evolved gas then passes upwardly through the outer annulus 33, abstracting heat from the reduced iron ore, and thence passes through the ports 34 to reduce the iron. The char or refuse resulting from the gasification of the lignite in this modification of this invention is suitably discharged by the device shown in Figure 12. A particular advantage in carrying out the reduction of iron ore in accordance with this feature of this invention is that the iron ore being reduced is in heat exchange relation with the lignite or other carbonaceous material being employed to generate the reduction gases, and the whole retort may be suitably arranged in a heating device as previously discussed. If desired, further quantities of water gas or other reducing gas may be introduced into the inner annulus into contact with highly heated, partially-reduced iron ore by means of the gas inlet 152.

However, iron ore may be directly reduced in admixture with lignite or other solid non-coking carbonaceous material employing the apparatus and process previously disclosed for the continuous complete gasification of subbituminous coal or lignite. In this modified process a high heating value gas of more than 300 B. t. u. per cubic foot, and one having a H₂/CO ratio of about 1.0 is obtained simultaneously with metallic iron. The iron oxide serves as a catalyst for the reduction while furnishing oxygen to make CO with lignite. Sponge or metallic iron is separated from the discharged solids by magnetic means.

As an example of the operation of the process for direct reduction of iron ore with simultaneous production of high heating value oxygenated water gas from admixed raw lignite, the following experimental data obtained from a test in a pilot plant of the same design as that shown in Figure 3, are cited:

In this test, oxidized magnetic iron ore, briquetted into small pellets, was mixed with raw lignite in ratio of 1:1 and charged into the upper reaction zone 33, wherein the mixture was heated progressively to about 1800° F. before passing into the lower reaction zone 35 wherein it was further heated in about the same temperature range while in contact with water gas generated in the reaction zone by reactants passing countercurrent to the descending solids. The reduced mixture consisting of metallic iron and fine high-ash lignite dust was discharged at the bottom while high heating value gas formed by reactions between lignite, steam and oxygen from the iron ore, within reaction zones 33 and 35, was removed from the system through heat exchange zone 40 and outlet 41. The following operating data were recorded:

| | |
|---|---:|
| Rate of feed of lignite, pounds per hour, about | 25 |
| Rate of feed of iron ore, pounds per hour, about | 25 |
| Rate of steam input to upper reaction zone | 0 |
| Rate of steam input to lower reaction zone lbs./hr. | 15 |
| Gas made, cubic feet per hour | 444 |
| Analysis of gas: | |
|     Carbon dioxide, percent | 1.4 |
|     Carbon monoxide, percent | 40.9 |
|     Hydrogen, percent | 55.6 |
|     Methane, percent | 2.1 |
|     Specific gravity | .480 |
|     Heating value, B. t. u. per cubic foot | 327 |
| Temperature, bottom of combustion chamber, point 1, °F | 1895 |
| Temperature, middle of combustion chamber, point 2, °F | 1855 |
| Temperature, top of combustion chamber, point 3, °F | 1620 |
| Temperature, outlet of furnace, point 4, °F | 1410 |
| Temperature, out of recuperator, point 5, °F | 845 |
| Temperature, gases leaving retort, point 12, °F | 515 |
| Temperature, solids leaving bottom of retort | 500 |

The sponge or metallic iron yielded was tested and found to be substantially completely reduced metallic iron.

*Process for continuous reduction of magnesium and other ores*

The heat exchanging annular reaction zone principle can also be applied to reactions requiring subatmospheric or superatmospheric pressures is limited only by the strength of available construction materials. By the provision of suitable pressure-equalizing inlet and outlet devices, as particularly shown in Figure 15 of the drawings, this invention can readily be adapted to a wide variety of gas-solid reactions such as the reduction of zinc ores, the recovery of mercury from cinnabar and the like, and particularly to the continuous production of magnesium from suitable magnesium ores and a suitable reducing agent; for example, the reduction of magnesite or dolomite with ferrosilicon. Referring to the drawings, an annular reaction device as previously described is provided with a suitable pressure equalizing inlet device which may take the form of a closed hopper 30, as shown in Fig. 15, provided with a gas sealing hopper inlet valve 78 and a reaction tube inlet valve 79 located between the hopper 30 and the pre-heat zone 80 of the reaction tube or housing 56. This inlet pressure equalizing device provides a means for passing solid materials from atmospheric pressure through the hopper inlet valve 78 into the inlet hopper 30. After a suitable batch has accumulated in the inlet hopper 30, the inlet valve 78 is closed, and the pressure equalizing valve 79 is slowly opened so that the pressure in the hopper 30 and in the preheating zone 80 is equalized and the solid feed then proceeds by gravity into the housing 56.

The interior space of the annular reaction zone is suitably modified to provide a suitable device capable of exhausting gaseous products and having the additional function of heating or cooling vaporous products of reaction. As shown, a suitable device comprises an axially positioned vertical tubular member 86 provided with vertical spaced horizontal condensing fins 85 and having an inner concentrically placed exhausting pipe 83 for removing gaseous products or carrier gases. The exhausting pipe 83 may be provided with a suitable control valve 153, which is preferably placed outside the elongated housing 56 for ready access. The condensing tube 86 may also be provided with means for heating or cooling the same, and as shown, such means may take the form of a cooling medium inlet pipe 81 axially placed within the condensing tube 86 and extending to the lower portion thereof, and a cooling medium outlet 82 located near the upper portion of the condenser tube 86 and connecting therewith. A control valve 84 optionally may be provided to control the pressure existing in the condensing tube 86. Preferably, the condenser fins 85 are enclosed in a vertically positioned annular insulating baffle of suitable material to insulate the condensing zone defined by the condensing tube 86 and fins 85 from the heat of the annular reaction zone 33.

At the lower end of the elongated vessel 56 is a pressure-equalizing discharge device for removing spent solid materials passing through the apparatus. Such a discharge device may take the form of a receiver 93 provided with a discharge valve and an outlet valve 94. The receiver 93 may also be provided with a pressure equalizing valve 113 communicating with the atmosphere for gradually bringing the pressure in the receiver 93 to atmosphere. The solids discharge device may be operated by closing valves 94 and 113 and opening valve 92 to fill the receiver 93 with solids at the same pressure as exists in the reaction zone 33. Thereupon the valve 92 is closed and the pressure equalizing valve 113 is gradually opened to bring the contents of the receiver 93 to atmospheric pressure. The discharge valve 94 may then be opened and the spent solids discharged at atmospheric pressure from the receiver 93.

Suitable means are provided for continuously discharging liquid condensate, such as metallic liquid magnesium, mercury, zinc, and the like, from the condensing zone 89 in the vessel 56. As shown, suitable condensate discharging means may take the form of a horizontal offtake pipe 90 suitably closed at one end by a cap 104, and communicating with a skimming pot 98 through a pressure equalizing lock system 96. The entire skimming pot 98 and lock system 96 is suitably supported in a refractory setting 108 heated by an auxiliary burner 109 in the lower portion thereof. The pressure equalizing lock system 96 comprises a plug valve 95, suitably positioned in the offtake pipe 90, and actuated by remote means such as a hand-controlled cam 99. By opening the plug valve 95 the liquid magnesium or other molten condensate proceeds from the condensing zone through the pipe 90 and valve 95 into the lock system 96. The molten magnesium is retained in the lock system 96 by a suitable valve 97 in the lower portion thereof communicating with the skimming pot 98. A pressure equalizing valve 107 is provided on the top of the lock 96. As previously stated, the entire lock system and skimming pot are enveloped in combustion gases produced in the auxiliary burner 109. Optionally, the horizontal baffle 101 is positioned in the combustion chamber 100 to cause the combustion gases to follow a circuitous route around the skimming pot 98 and the lock chamber 96, whereby local overheating is inhibited. The combustion gases escape through a vent 105 on the upper portion of the combustion chamber 100. Desirably, the skimming pot and the lock chamber are supported by suitable resilient means permitting relative movement to compensate for expansion of the metallic parts of the device. Such supporting means may take the form of a supporting beam 102 which carries the mechanism and which is in turn supported by springs 103. In operating the lock chamber and skimming pot, liquid condensate proceeds from the condensing zone 89 in the elongated vessell 56 through the offtake pipe 90 and the valve 95 into the lock chamber 96, where it is retained by the lower valve 97. Thereupon, the valve 95 is closed, and the pressure equalizing valve 107 is gradually opened bringing the contents of the lock chamber 96 to atmospheric pressure. The valve 97 may then be opened to fill the pot 98 with molten liquid condensate, such as molten magnesium. Desirably, further purifying operations, such as fluxing and the like, may be carried out in the pot 98.

In carrying out the reduction of a suitable magnesium ore in accordance with this invention, the magnesium ore is comminuted to a relatively fine particle size and admixed with a suitable quantity of finely divided ferro-silicon. The resulting mixture is formed into balls or briquets having, for example, a size of one-half to three-quarters of an inch in diameter, and the briquetted mixture is then introduced into the inlet hopper 30 through the valve 78. The heat exchanging and condensing zone interior of the elongated vessel 56 is then exhausted or evacuated to a suitable pressure, say 1 mm. absolute, through the valve 153 by means not shown. The elongated vessel 56 is then heated to a suitable temperature of about 2100° F. by means of the heating system previously described in connection with other applications of this apparatus. The valves 111, 95, 92, and 84 are closed, and the valve 79 is opened, to admit the charge into the preheating zone 80 and the annular reaction zone 33. As the reaction mixture proceeds downwardly through the annular reaction zone 33 by gravity, it is brought to a suitable temperature at which magnesium ores are reduced by ferrosilicon, and the liberated magnesium vapors pass concurrently through the annular reaction zone 33 and emerging into the heat exchange zone through the apertures 34, pass upwardly over the baffle 87 and thence downwardly into the condensing zone 85. The solid materials continue to fall downwardly by gravity into the lower reaction annulus 35 forming a continuation of the upper reaction annulus 33, where reduction of the solid material is completed, and the liberated vapors pass upwardly in countercurrent relation to the descending solids. The spent ore is collected in the cooling zone 91 located in the lower portion of the elongated vessel 56 and is discharged through the solids discharge device previously described. The magnesium or other evolved vapors pass into the condensing zone 89 where they are condensed on the condensing pipe 86 and the condensing fins. The condensing pipe 86 and associated fins are maintained at a temperature below the temperature at which the vapor is condensed but above the temperature at which the condensate solidifies. A suitable temperature for magnesium is in the range of 800° to 650° C. at 1 mm. Hg pressure. The temperature within the condensing tube is preferably regulated by circulating in the interior of the condensing tube 86 a suitable inert gas which may be admitted through the valve 81 and removed through the valve 82. Non-condensible vapor or gases are removed through the outlet tube 83 and the exhausting valve 153. The molten magnesium or other condensate falls by gravity from the condenser 86 and the fins through the condensing zone 89 and passes into the lock chamber 96 through the offtake pipe 90 and the valve 95. Upon accumulation of a suitable body of condensate in the lock chamber 96, the valve 95 is closed, and the charge is brought to atmospheric pressure by admitting a suitable inert gas through the valve 107, and the lock chamber 96 is then discharged through the outlet valve 97 into the pot 98. A suitable protective slag or flux is maintained on the surface of the molten metal or other condensate collected in the pot 98, to prevent oxidation of the contents thereof. The pot 98 and the lock chamber 96 are maintained at a temperature above the solidification point of the condensate but below the vaporization temperature thereof by means of the burner 109 and associated refractory setting 108.

In order to reinforce the elongated vessel 56 to enable it to withstand the extremely low vacuum employed in the reduction of magnesium ores, suitable stays 110 may be provided to strengthen the vessel at its weaker or more highly heated points and, as shown, they may be placed horizontally to connect the baffle 87 with the previously described heat exchange device and the vessel 56.

Optionally, in the reduction of magnesium ores employing the method and means of this invention, the inside of the vessel may be flooded with a suitable inert gas, for example, hydrogen, helium, argon, or other gas substantially inert to the magnesium or other metal being produced. This may be accomplished by introducing such an inert gas through a suitable valve 111 located in the upper portion of the vessel 56 as shown, and the inert gas may be withdrawn through exhausting valve 153. By this means, the partial pressure of the magnesium vapors or other reactive vapor in the interior of the apparatus may be lowered to such an extent as to approximate the usual partial pressure under high vacuum conditions.

It will be apparent from the foregoing description, there has been provided a method and means for carrying out reactions in a novel and desirable manner. A very excellent heat economy is secured by this invention. Heat transfer between an exterior source of heat, and a solid reactant is very greatly superior in my invention to any previously known device for accomplishing this purpose. Furthermore, the device is eminently suited to construction materials capable of withstanding the relatively high temperature often encountered in the endothermic reactions described, thus promoting a very long equipment life. For example, the reaction vessel and the heat interchange elements may be made of corrosion-resistant chrome-nickel steels, alone or provided with a protective coating of chromium, or the like. As the apparatus is susceptible of construction in generally circular or cylindrical shapes, the usual expansion problems normally encountered are largely or completely obviated.

Since many apparently widely differing embodiments of the invention will occur to one skilled in the art, various changes may be made in the method and means described and shown, without departing from the spirit and scope of this invention.

What is claimed is:

1. A method for conducting an endothermic chemical reaction involving gaseous and solid materials which comprises passing a comminuted non-caking coal, having at least 10% by weight of oxygen content on moisture- and ash-free basis, together with from 0.2 to 2 pounds of steam per pound of coal, through a heated annular reaction zone of progressively increasing temperature from about 700° Fahrenheit to about 2000° Fahrenheit, then separating evolved gases and vapors from the heated solids, passing them in indirect heat exchange relationship to said reaction zone countercurrent to material flow therein and recovering said evolved gases and vapors, then passing the partially-reacted coal through a second annular reaction zone maintained at a temperature gradient, measured in the direction of solid material flow, proceeding from about 2000° F. to about 700° F., while passing an oxygenated gas from the group of air, steam, oxygen and carbon dioxide first in indirect co-current heat exchange relation to said coal in said second zone and then in a direct countercurrent heat exchange relation to said coal in said second zone, whereby said oxygenated gas reacts with said heated coal and is replaced by evolved hydrogen and carbon monoxide, and finally combining said evolved gases from said second zone with the evolved gases and vapors from said first zone.

2. A method for conducting an endothermic chemical reaction involving both gaseous and solid feed materials which comprises passing said solids and a portion of said gaseous materials co-currently through an externally-heated annular reaction zone, withdrawing gaseous products of reaction from a point near the zone of maximum reaction temperature through an eduction zone interior of said annular reaction zone, said gaseous products being passed in countercurrent indirect heat exchange with said solid reactants, then passing said solid materials countercurrently to gaseous materials through a second externally-heated annular reaction zone in direct heat exchange relationship with additional incoming gaseous feed materials which are supplied to said second reaction zone after indirect heat exchange with the materials therein.

VERNON FRANK PARRY.

REFERENCES CITED

The following references are of record in the file of this patent:

UNITED STATES PATENTS

| Number | Name | Date |
|---|---|---|
| 1,382,746 | Schrader et al. | June 28, 1921 |
| 1,615,593 | Manker | Jan. 25, 1927 |
| 1,618,566 | Bergh | Feb. 22, 1927 |
| 1,912,974 | Debauche | June 6, 1933 |

(Other references on following page)

UNITED STATES PATENTS

| Number | Name | Date |
|---|---|---|
| 1,928,140 | Smith | Sept. 26, 1933 |
| 1,977,684 | Lucke | Oct. 23, 1934 |
| 2,037,241 | Kangro et al. | Apr. 14, 1936 |
| 2,229,799 | Dean | Jan. 28, 1941 |
| 2,258,374 | Amati | Oct. 7, 1941 |

OTHER REFERENCES

Meade: "Modern Gasworks Practise," 2nd edition, pp. 385, 390.

Haslam et al.: "Fuels and Their Combustion," pp. 162–163.

Parry et al.: "Industrial and Engineering Chemistry," vol. 40, pp. 627–641 (1948).

Griswold: "Fuels, Combustion and Furnaces," 1st edition, 1946, p. 226.

Certificate of Correction

Patent No. 2,572,051                                            October 23, 1951

VERNON FRANK PARRY

It is hereby certified that error appears in the printed specification of the above numbered patent requiring correction as follows:

Column 7, line 60, for "Surrounding" read *Surmounting*; column 22, line 28, for "distillattion" read *distillation*; column 24, lines 49 and 50, after "pressures" insert the comma and words *, and the usual range of pressures*; column 26, line 23, for "vessell" read *vessel*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*